United States Patent
Sun

(10) Patent No.: US 11,934,485 B2
(45) Date of Patent: Mar. 19, 2024

(54) METHOD AND APPARATUS FOR GENERATING TRAINING SAMPLE OF SEMANTIC SEGMENTATION MODEL, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Zixun Sun, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 374 days.

(21) Appl. No.: 17/516,883

(22) Filed: Nov. 2, 2021

(65) Prior Publication Data

US 2022/0058436 A1 Feb. 24, 2022

Related U.S. Application Data

(63) Continuation of application No. PCT/CN2020/120140, filed on Oct. 10, 2020.

(30) Foreign Application Priority Data

Oct. 29, 2019 (CN) .......................... 201911039504.3

(51) Int. Cl.
*G06K 9/00* (2022.01)
*A63F 13/52* (2014.01)
(Continued)

(52) U.S. Cl.
CPC ............ *G06F 18/214* (2023.01); *A63F 13/52* (2014.09); *G06F 18/24* (2023.01); *G06T 7/11* (2017.01);
(Continued)

(58) Field of Classification Search
CPC . G06T 2207/20081; G06T 2207/20084; G06T 7/11; G06T 7/0012;
(Continued)

(56) References Cited

U.S. PATENT DOCUMENTS

| 11,599,783 | B1 * | 3/2023 | Hong ..................... G06N 5/027 |
| 2018/0276821 | A1 | 9/2018 | Lin et al. | |
| 2019/0252073 | A1 * | 8/2019 | Hsu ........................ G06N 3/047 |

FOREIGN PATENT DOCUMENTS

| CN | 102982578 A | 3/2013 |
| CN | 105 069 846 B | 8/2018 |

(Continued)

OTHER PUBLICATIONS

Y. Ouali, C. Hudelot and M. Tami, "Semi-Supervised Semantic Segmentation With Cross-Consistency Training," 2020 IEEE/CVF Conference on Computer Vision and Pattern Recognition (CVPR), Seattle, WA, USA, 2020 (Year: 2020).*

(Continued)

*Primary Examiner* — Alex Kok S Liew
(74) *Attorney, Agent, or Firm* — Crowell & Moring LLP

(57) ABSTRACT

The present disclosure provides methods, apparatus, and storage medium for generating a training sample of a semantic segmentation model. The method includes obtaining an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps; determining transformation models corresponding to the three-dimensional model; generating a plurality of sample image groups corresponding to each transformation model according to the plurality of colorful skin maps and each transformation model; generating a labeled image of the each sample image group according to the object iden- (Continued)

tifier, the plurality of solid-color skin maps, and each transformation model; and generating a training sample of the to-be-trained object according to the labeled image and the each sample image group.

20 Claims, 11 Drawing Sheets

(51) Int. Cl.

| | | |
|---|---|---|
| *G06F 18/214* | (2023.01) | |
| *G06F 18/24* | (2023.01) | |
| *G06T 7/11* | (2017.01) | |
| *G06T 15/04* | (2011.01) | |
| *G06T 17/00* | (2006.01) | |
| *G06V 10/44* | (2022.01) | |
| *G06V 10/56* | (2022.01) | |
| *G06V 30/262* | (2022.01) | |
| *G06N 20/00* | (2019.01) | |

(52) U.S. Cl.
CPC .............. *G06T 15/04* (2013.01); *G06T 17/00* (2013.01); *G06V 10/44* (2022.01); *G06V 10/56* (2022.01); *G06V 30/274* (2022.01); *G06N 20/00* (2019.01); *G06T 2207/20081* (2013.01)

(58) Field of Classification Search
CPC . G06T 2207/30024; G06T 2207/10056; G06T 7/0014; G06T 2207/10016; G06T 7/10; G06T 2207/10064; G06T 2207/30072; G06T 7/0016; G06T 2207/10024; G06T 2207/10088; G06T 2200/24; G06T 2207/10032; G06T 2207/30252; G06T 7/20; G06T 2207/10081; G06T 2207/20016; G06T 2207/20021; G06N 3/045; G06N 3/08; G06N 3/084; G06N 20/00; G06N 3/088; G06N 3/047; G06N 3/04; G06N 3/0464; G06N 3/048; G06N 3/063; G06N 7/01; G06V 10/82; G06V 10/764; G06V 10/454; G06V 10/774; G06V 10/25; G06V 20/56; G06V 2201/03
See application file for complete search history.

(56) References Cited

FOREIGN PATENT DOCUMENTS

| | | |
|---|---|---|
| CN | 108509855 A | 9/2018 |
| CN | 109 224 444 A | 1/2019 |
| CN | 109635853 A | 4/2019 |
| CN | 110 314 379 A | 10/2019 |
| CN | 110363175 A | 10/2019 |
| CN | 110852332 A | 2/2020 |

OTHER PUBLICATIONS

X. Chen, Y. Yuan, G. Zeng and J. Wang, "Semi-Supervised Semantic Segmentation with Cross Pseudo Supervision," 2021 IEEE/CVF Conference on Computer Vision and Pattern Recognition (CVPR), Nashville, TN, USA, 2021 (Year: 2021).*
J. Mei, B. Gao, D. Xu, W. Yao, X. Zhao and H. Zhao, "Semantic Segmentation of 3D LiDAR Data in Dynamic Scene Using Semi-Supervised Learning," in IEEE Transactions on Intelligent Transportation Systems, vol. 21, No. 6, pp. 2496-2509, Jun. 2020 ( Year: 2020).*
Zhang, Semi-supervised Semantic Segmentation of Prostate and Organs-at-Risk on 3D Pelvic CT Images, arxiv, 2020 (Year: 2020).*
Z. Liu, X. Qi and C.-W. Fu, "One Thing One Click: A Self-Training Approach for Weakly Supervised 3D Semantic Segmentation," 2021 IEEE/CVF Conference on Computer Vision and Pattern Recognition (CVPR), Nashville, TN, USA, 2021 (Year: 2021).*
International Search Report with English translation and Written Opinion regarding PCT/CN2020/120140 dated Jan. 12, 2021.
Chinese Office Action with concise English translation regarding 201911039504.3 dated Sep. 7, 2020.
Extended European Search Report regarding EP 20 882 890.5 dated Jul. 21, 2022, 9 pages.

* cited by examiner

METHOD AND APPARATUS FOR GENERATING TRAINING SAMPLE OF SEMANTIC SEGMENTATION MODEL, STORAGE MEDIUM, AND ELECTRONIC DEVICE

RELATED APPLICATION

This application is a continuation application of PCT Patent Application No. PCT/CN2020/120140, filed on Oct. 10, 2020, which claims priority to Chinese Patent Application No. 201911039504.3, filed with the National Intellectual Property Administration, PRC on Oct. 29, 2019, both of which are incorporated herein by reference in their entireties.

FIELD OF THE TECHNOLOGY

This application relates to the field of computers, and in particular, to a method and an apparatus for generating a training sample of a semantic segmentation model, a storage medium, and an electronic device.

BACKGROUND OF THE DISCLOSURE

Currently, when recommending a game to a user, a recommendation system based on game contents usually generates a propaganda poster related to the game. The propaganda poster may include contents such as a character image of a game character and an introduction of skills, for the user to quickly understand basic information of the game. Generally, the character image can be automatically recognized from a game scene by using a pre-trained deep learning model.

When a training sample of a deep learning model for automatically recognizing a character image is manually prepared, this manner of generating a training sample may associate with low efficiency and high costs.

The embodiments of this application provide a method and apparatus for generating a training sample of a semantic segmentation model, addressing at least one of the problems/issues described above, improving the efficiency and/or lowering costs.

SUMMARY

Embodiments of this application provide methods, apparatus, and related devices for generating a training sample of a semantic segmentation model, improving the efficiency and/or lowering costs.

The present disclosure describes a method for generating a training sample of a semantic segmentation model. The method includes obtaining, by a device, an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps. The device includes a memory storing instructions and a processor in communication with the memory. The method also includes determining, by the device, transformation models corresponding to the three-dimensional model, each of the transformation models corresponding to a different orientation angle; generating, by the device, a plurality of sample image groups corresponding to each transformation model according to the plurality of colorful skin maps and each transformation model, each sample image group comprising a plurality of sample images; generating, by the device, a labeled image of the each sample image group according to the object identifier, the plurality of solid-color skin maps, and each transformation model, the labeled image being used for labeling the sample images in the each sample image group; and generating, by the device, a training sample of the to-be-trained object according to the labeled image and the each sample image group, to train the semantic segmentation model by using the training sample of the to-be-trained object.

The present disclosure describes an apparatus for generating a training sample of a semantic segmentation model. The apparatus includes a memory storing instructions; and a processor in communication with the memory. When the processor executes the instructions, the processor is configured to cause the apparatus to perform obtaining an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps, determining transformation models corresponding to the three-dimensional model, each of the transformation models corresponding to a different orientation angle, generating a plurality of sample image groups corresponding to each transformation model according to the plurality of colorful skin maps and each transformation model, each sample image group comprising a plurality of sample images, generating a labeled image of the each sample image group according to the object identifier, the plurality of solid-color skin maps, and each transformation model, the labeled image being used for labeling the sample images in the each sample image group, and generating a training sample of the to-be-trained object according to the labeled image and the each sample image group, to train the semantic segmentation model by using the training sample of the to-be-trained object.

The present disclosure describes a non-transitory computer-readable storage medium, storing computer-readable instructions. The computer-readable instructions, when executed by a processor, are configured to cause the processor to perform: obtaining an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps; determining transformation models corresponding to the three-dimensional model, each of the transformation models corresponding to a different orientation angle; generating a plurality of sample image groups corresponding to each transformation model according to the plurality of colorful skin maps and each transformation model, each sample image group comprising a plurality of sample images; generating a labeled image of the each sample image group according to the object identifier, the plurality of solid-color skin maps, and each transformation model, the labeled image being used for labeling the sample images in the each sample image group; and generating a training sample of the to-be-trained object according to the labeled image and the each sample image group, to train a semantic segmentation model by using the training sample of the to-be-trained object.

Another embodiment of this application provides a method for generating a training sample of a semantic segmentation model, the semantic segmentation model being configured to segment an image to obtain an object, the method being performed by an electronic device, and including:

obtaining an object identifier of a to-be-trained object and a model file corresponding to the object identifier, the model file including a three-dimensional model of the to-be-trained object and a skin map set, the skin map set including a plurality of solid-color skin maps and a plurality of colorful skin maps;

determining transformation models corresponding to the three-dimensional model at different orientation angles, each of the orientation angles being corresponding to one of the transformation models;

generating a plurality of sample image groups corresponding to each transformation model according to the plurality of colorful skin maps and each transformation model, each of the sample image groups including a plurality of sample images;

generating a label image of the each sample image group according to the object identifier, the plurality of solid-color skin maps, and each transformation model, the label image being used for labeling the sample images in the each sample image group; and generating a training sample of the to-be-trained object according to the label image and the each sample image group, to train the semantic segmentation model by using the training sample of the to-be-trained object.

An embodiment of this application further provides an apparatus for generating a training sample of a semantic segmentation model, the semantic segmentation model being configured to segment an image to obtain an object, the apparatus including:

an obtaining module, configured to obtain an object identifier of a to-be-trained object and a model file corresponding to the object identifier, the model file including a three-dimensional model of the to-be-trained object and a skin map set, the skin map set including a plurality of solid-color skin maps and a plurality of colorful skin maps;

a determining module, configured to determine transformation models corresponding to the three-dimensional model at different orientation angles, each of the orientation angles being corresponding to one of the transformation models;

a first generation module, configured to generate a plurality of sample image groups corresponding to each transformation model according to the plurality of colorful skin maps and each transformation model, each of the sample image groups including a plurality of sample images;

a second generation module, configured to generate a label image of the each sample image group according to the object identifier, the plurality of solid-color skin maps, and each transformation model, the label image being used for labeling the sample images in the each sample image group; and a third generation module, configured to generate a training sample of the to-be-trained object according to the label image and the each sample image group, to train the semantic segmentation model by using the training sample of the to-be-trained object.

The first generation module is specifically configured to:
render each transformation model according to each of the colorful skin maps, to obtain a plurality of corresponding first rendered models;
project each of the first rendered models onto a game scene according to a plurality of preset projection directions, to obtain a plurality of first projection scenes, each of the projection directions being corresponding to one of the first projection scenes;
generate an image of each of the first projection scenes, and use the generated image as a sample image; and
classify sample images corresponding to the same preset projection direction and the same transformation model as a group, to obtain the plurality of sample image groups.

The plurality of solid-color skin maps include a black skin map and a white skin map, and the second generation module specifically includes:

a first determining unit, configured to determine a plurality of first reference image groups according to the black skin map, a plurality of preset projection directions, and each transformation model;

a second determining unit, configured to determine a plurality of second reference image groups according to the white skin map, the plurality of preset projection directions, and each transformation model; and a generation unit, configured to generate the label image of the each sample image group according to the object identifier, the plurality of first reference image groups, and the plurality of second reference image groups.

The first determining unit is specifically configured to:
render each transformation model according to the black skin map, to obtain a plurality of corresponding second rendered models;
project each of the second rendered models onto a game scene according to the plurality of preset projection directions, to obtain a plurality of second projection scenes, each of the projection directions being corresponding to one of the second projection scenes;
generate an image of each of the second projection scenes, and use the generated image as a first reference image; and
classify first reference images corresponding to the same transformation model as a group, to obtain the plurality of first reference image groups.

The generation unit is specifically configured to:
obtain a first reference image and a second reference image that correspond to the same preset projection direction from a first reference image group and a second reference image group that correspond to the same transformation model;
change a color of a region in which black pixels are located in the obtained first reference image into white, and change a color of the remaining region in the first reference image into black;
change a color of the remaining region in the obtained second reference image other than a region in which white pixels are located into black; and
generate the label image of the corresponding sample image group according to the object identifier, the changed first reference image, and the changed second reference image.

The generation unit is specifically configured to:
determine an overlapping region between white pixels in the changed first reference image and the white pixels in the changed second reference image;
change a color of the remaining region in the changed first reference image or the changed second reference image other than the overlapping region into black, to obtain a target reference image; and
replace, by using a value of the object identifier as a color value, a color of the region in which white pixels are located in the target reference image, to obtain the label image of the sample image group corresponding to the same transformation model and the same preset projection direction.

The apparatus for generating a training sample further includes a training module and a segmentation module.

The training module is configured to: after the third generation module generates the training sample of the to-be-trained object according to the label image and the each sample image group, input the training sample into a preset semantic segmentation model for training, to obtain a trained model.

The segmentation module is configured to: obtain an object segmentation instruction, the object segmentation instruction carrying a target game image, the target game image including at least one to-be-segmented object; and input the target game image into the trained model according to the object segmentation instruction, to obtain an object contour and an object identifier of the to-be-segmented object.

The segmentation module is further configured to:
after the object contour and the object identifier of the to-be-segmented object are obtained, extract an image corresponding to the to-be-segmented object from the target game image according to the object contour;
obtain a target background image and a text description content of the to-be-segmented object;
project the extracted image onto the target background image, to obtain a projection image; and
generate the text description content on the projection image, to obtain a cover image.

The obtaining module is further configured to:
before the obtaining an object identifier of a to-be-trained object and a model file corresponding to the object identifier, determine an installation path of a game application;
determine a plurality of storage files with file suffixes of a preset character string according to the installation path;
group the plurality of storage files according to file names of the storage files, to obtain a plurality of storage file groups, file names of each of the storage file groups including a name of the same game object;
determine an object identifier of each game object; and
extract a model file from a storage file group corresponding to the each game object, and copy and save the model file and the object identifier.

An embodiment of this application further provides a computer-readable storage medium, storing a plurality of instructions, the plurality of instructions being configured to be loaded by a processor, to perform the method for generating a training sample of a semantic segmentation model according to the embodiments of this application.

An embodiment of this application further provides an electronic device, including a processor and a memory, the processor being electrically connected to the memory, the memory being configured to store instructions and data, and the processor being configured to perform the operations in the method for generating a training sample of a semantic segmentation model according to the embodiments of this application.

BRIEF DESCRIPTION OF THE DRAWINGS

The following describes specific implementations of this application in detail with reference to the accompanying drawings, to make the technical solutions and other beneficial effects of this application obvious.

DESCRIPTION OF EMBODIMENTS

The following clearly and completely describes the technical solutions in embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Generally, a training sample of a deep learning model for automatically recognizing a character image is manually prepared. The game "Honor of Kings" is used as an example. To enable a deep learning model to well recognize a hero, about 1000 training samples need to be prepared. For each training sample, a sample image is obtained by manually taking a screenshot from a game scene for the hero with a different game skin and at a different position in a gaming environment, which may be referred as a map position, and the sample image needs to be manually labeled. Assuming that there are 100 heroes in "Honor of Kings", 100,000 training samples need to be prepared through manual screenshots and labeling. According to that one person can label 150 samples per hour and performs labeling for 8 hours one day, it requires more than 83 days of work for one person. It is very evident that this manner of generating a training sample has extremely low efficiency and high costs.

Therefore, the embodiments of this application provide a method and apparatus for generating a training sample, a storage medium, and an electronic device, to automatically generate a sample image and a label image without manual screenshots and labeling.

Figure 1:
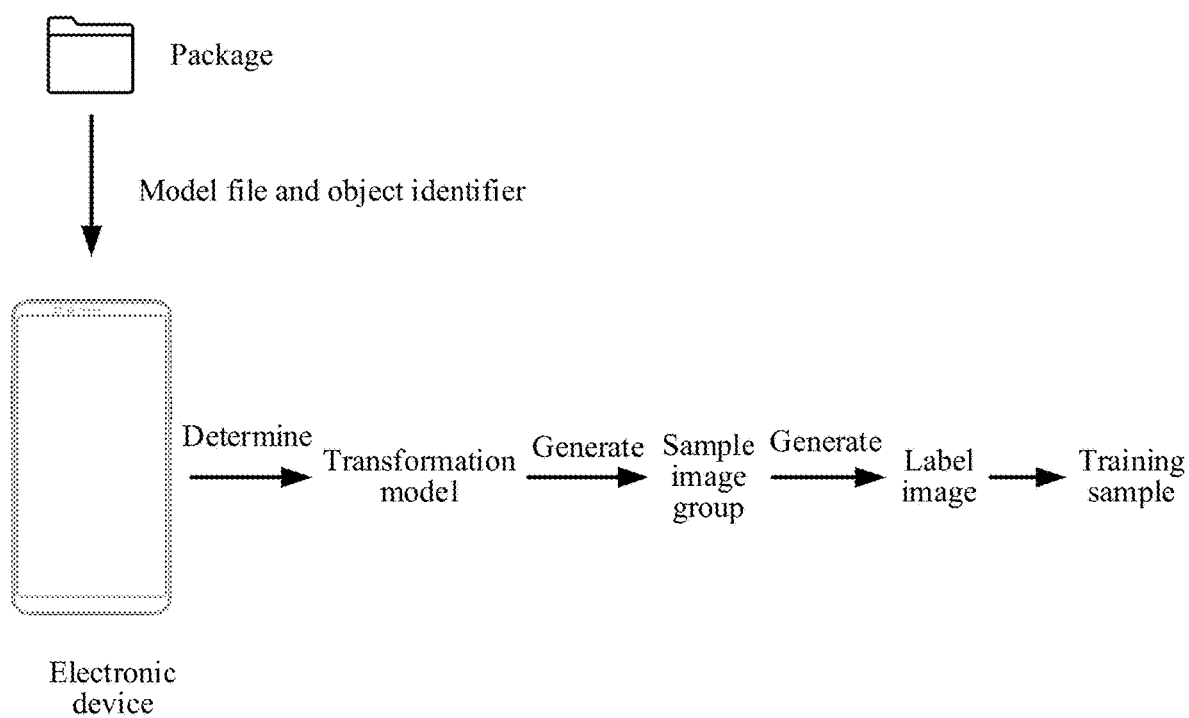
FIG. 1 is a schematic diagram of a scenario of a system for generating a training sample according to an embodiment of this application.

FIG. 1 is a schematic diagram of a scenario of a system for generating a training sample. The system for generating a training sample may include any apparatus for generating a training sample provided in the embodiments of this application. The apparatus for generating a training sample may be integrated in an electronic device. The electronic device may be a backend server of a game application manufacturer.

In some embodiments, the electronic device may include an artificial intelligence (AI) processor. The AI processor is configured to process a computing operation related to machine learning.

AI is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields, and including both a hardware-level technology and a software-level technology. Basic AI technologies generally include technologies such as sensor, dedicated AI chip, cloud computing, distributed storage, a big data processing technology, operation/interaction system, and mechatronics. AI software technologies mainly include several major directions such as a computer vision (CV) technology, a speech processing technology, a natural language processing technology, and machine learning/deep learning.

Machine learning (ML) is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Due to successful application of ML in the field of vision, researchers also introduce ML to the field of image processing. For example, ML is applied to recognize a game object in a game image and obtained the recognized game object through segmentation, to obtain an object contour and an object identifier of the game object obtained through segmentation, thereby generating a propaganda poster including the game object obtained through segmentation. The electronic device may obtain an object identifier of a to-be-trained object and a model file corresponding to the object identifier, the model file including a three-dimensional model and a skin map set, the skin map set including a plurality of solid-color skin maps and a plurality of colorful skin maps; determine transformation models corresponding to the three-dimensional model at different orientation angles, each of the orientation angles being corresponding to one of the transformation models; generate a plurality of sample image groups corresponding to each transformation model according to the plurality of colorful skin maps and each transformation model; generate a label image of the each sample image group according to the object identifier, the plurality of solid-color skin maps, and each transformation model; and generate a training sample of the to-be-trained object according to the label image and the each sample image group.

The object identifier is a code manually generated by a user or automatically generated by a system for each game object (including the to-be-trained object), and is used for uniquely identifying the game object in a game. The three-dimensional model refers to a coordinate model formed by three-dimensional coordinate points, and is used for describing a shape and a contour of the game object. Generally, different game objects have different three-dimensional models. The orientation angle may be manually preset. For example, an angle may be selected from 0° to 360° every 30° as an orientation angle. The transformation model is a model obtained after the three-dimensional model rotates 0°, 30°, or 60° from a default angle. The label image is used for labeling the sample images in the sample image group, for example, labeling a contour, an appearance, and an object identifier of a game object on a sample image. For sample images in the same sample image group, the same label image is used.

For example, referring to FIG. 1, the electronic device may obtain a model file and an object identifier of a to-be-trained object from a package of a game application; export a three-dimensional model in the model file by using preset software, for example, unity3D software; change an orientation of the three-dimensional model according to different orientation angles (such as 0, 30°, . . . , 360°), and use the three-dimensional model in a different orientation as a different transformation model; subsequently generate a plurality of sample image groups according to colorful skin maps and the transformation model; subsequently generate a label image of each of the sample image groups according to the object identifier, solid-color skin maps, and the transformation model; and use each sample image and the corresponding label image as a training sample for subsequent model training.

Figure 2A:
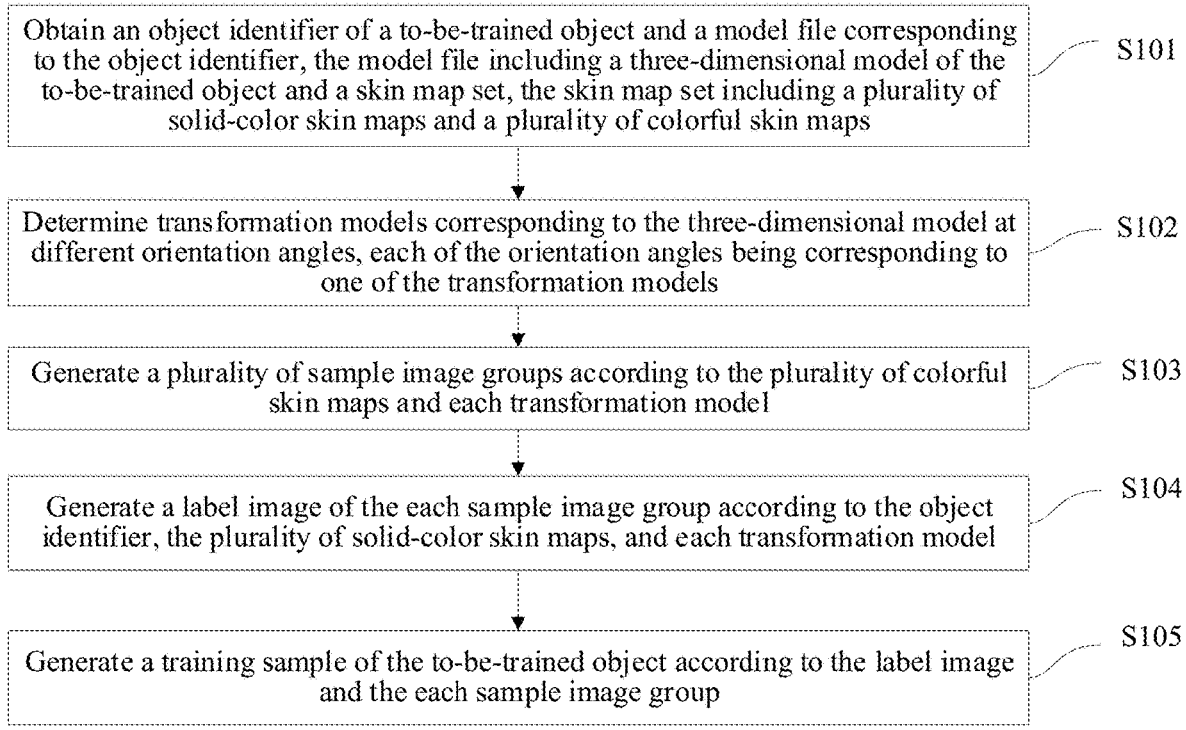
FIG. 2A is a schematic flowchart of a method for generating a training sample according to an embodiment of this application.

FIG. 2A is a schematic flowchart of a method for generating a training sample according to an embodiment of this application. The method for generating a training sample is applicable to an electronic device. The electronic device may be a backend server of a game application manufacturer. A specific procedure may include the following steps:

S101: Obtain an object identifier of a to-be-trained object and a model file corresponding to the object identifier, the model file including a three-dimensional model of the to-be-trained object and a skin map set, the skin map set including a plurality of solid-color skin maps and a plurality of colorful skin maps. In some implementations, a skin map may include skin texture which is used to cover a portion or all of an outside surface of the to-be-trained object. A skin map set may be a set of one or more skin map. In other implementations, the skin map set may include a plurality of solid-color skin maps and/or a plurality of colorful skin maps.

In this embodiment, the object identifier is a code manually generated by a user or automatically generated by a system for each game object (including the to-be-trained object), and is used for uniquely identifying the game object in a game. Skin maps in the skin map set are texture maps. The colorful skin maps may be generated by randomly selecting four colors from a 256-color palette each time, and a quantity of the colorful skin maps may be 256. In some other implementations, each skin map of the colorful skin maps may be generated by randomly selecting four colors from a 256-color palette, and a number of skin maps in the colorful skin maps may be 256.

The plurality of solid-color skin maps refer to texture maps with a single color, and may include a black skin map and a white skin map. The black skin map refers to a solid-color skin map in completely black, and the white skin map refers to a solid-color skin map in completely white. The three-dimensional model refers to a coordinate model formed by three-dimensional coordinate points, and is used for describing a shape and a contour of the game object. Generally, different game objects have different three-dimensional models.

The model file may be manually inputted by the user, for example, manually extracted from a game package, or may be automatically obtained by the system. In this case, before step S101, the method for generating a training sample further includes:
determining an installation path of a game application;
determining a plurality of storage files with file suffixes of a preset character string according to the installation path;
grouping the plurality of storage files according to file names of the storage files, to obtain a plurality of storage file groups, file names of each of the storage file groups including a name of the same game object;
determining an object identifier of each game object; and
extracting a model file from a storage file group corresponding to the each game object, and copying and saving the model file and the object identifier.

In this embodiment, after the game application is installed, a storage location of the package may be found based on the installation path, and all storage files with suffixes of the preset character string at the storage location are extracted; the storage files are grouped according to names of game objects, and storage files of the same game object are classified as the same group. For example, some storage files at the storage location may be shown in FIG. 3, where the installation path may be . . . //com.tencent.tmgp.sgame/files/Resources/AssetBundle/, and the preset character string may be ".assetbundle". It can be seen from FIG. 3 that storage files displayed in the current page all have the same name "LianPo", that is, all the storage files are associated files of a game object "LianPo"; and an object identifier of "LianPo" is 105.

S102: Determine transformation models corresponding to the three-dimensional model at different orientation angles, each of the orientation angles being corresponding to one of the transformation models.

In some implementation, the step S102 may include determining a set of transformation models corresponding to the three-dimensional model, each of the set of transformation models corresponding to a different orientation angle.

In this embodiment, the orientation angle may be manually preset. For example, an angle may be selected from 0° to 360° every 30° as an orientation angle, so that there are 12 orientation angles, such as 0°, 30°, or 60°. Correspondingly, the transformation model is a model obtained after the three-dimensional model rotates 0°, 30°, or 60° from a default angle.

S103: Generate a plurality of sample image groups corresponding to each transformation model according to the plurality of colorful skin maps and each transformation model, each of the sample image groups including a plurality of sample images.

For example, step S103 may specifically include:
rendering the transformation model according to each of the colorful skin maps, to obtain a corresponding first rendered model;
projecting the first rendered model onto a game scene according to a plurality of preset projection directions, to obtain a plurality of first projection scenes, each of the projection directions being corresponding to one of the first projection scenes;
generating an image of each of the first projection scenes, and using the generated image as a sample image; and
classifying sample images corresponding to the same preset projection direction and the same transformation model as a group, to obtain the plurality of sample image groups.

In this embodiment, the first rendered model is obtained by rendering a transformation model with a colorful skin map as a texture. The preset projection directions may be manually set. Because a deep learning network has translation invariance, it is unnecessary to generate images in a large quantity of positions, and only images in a left direction, a middle direction, and a right direction need to be generated. That is, the projection directions may be set to three types: a left region, a middle region, and a right region. The game scene is a three-dimensional scene. Coordinates of the first rendered model may be updated based on a coordinate system of the game scene, to project the first rendered model onto the game scene. Subsequently, a three-dimensional first projection scene may be outputted as a two-dimensional image by using a screen recording function of preset software, for example, unity3D software, to obtain a sample image. That is, animation of the first projection scene is generated by using the preset software, for example, unity3D software, and an image of the animation is captured by using a screenshot function. The captured image is the sample image.

Sample images that are in the same projection direction, at the same orientation angle, and of the same game object may be classified as one group. For example, if an object identifier is 075, the orientation angle O is 30°, and the projection direction P is LEFT, a naming format of the sample image group may be 075_N1_{001, 002, . . . 256}_O_30°_P_LEFT, and a naming format of sample images in the sample image group may be:

075_N1_xxx_O_30°_P_LEFT, where N1 represents a colorful skin map, and assuming that there are 256 colorful skin maps, which may be sequentially marked as 001-256, xxx is any value of {001, 002, . . . 256}, for example, 002.

S104: Generate a label image of the each sample image group according to the object identifier, the plurality of solid-color skin maps, and each transformation model, the label image being used for labeling the sample images in the each sample image group. In some implementations, a label image may be referred as a labeled image.

In some other implementations, the step S104 may include generating a labeled image of the each sample image group according to the object identifier, the plurality of solid-color skin maps, and each transformation model. The labeled image may be used for labeling the sample images in the each sample image group. In other implementations, the labeled image may be generated by labeling the sample images in the each sample image group.

In this embodiment, the label image is used for labeling the sample images in the sample image group, for example, labeling a contour, an appearance, and an object identifier of a game object on a sample image. For sample images in the same sample image group, the same label image is used. In the related art, a sample image is labeled through a manual operation, which has low efficiency.

Figure 2B:
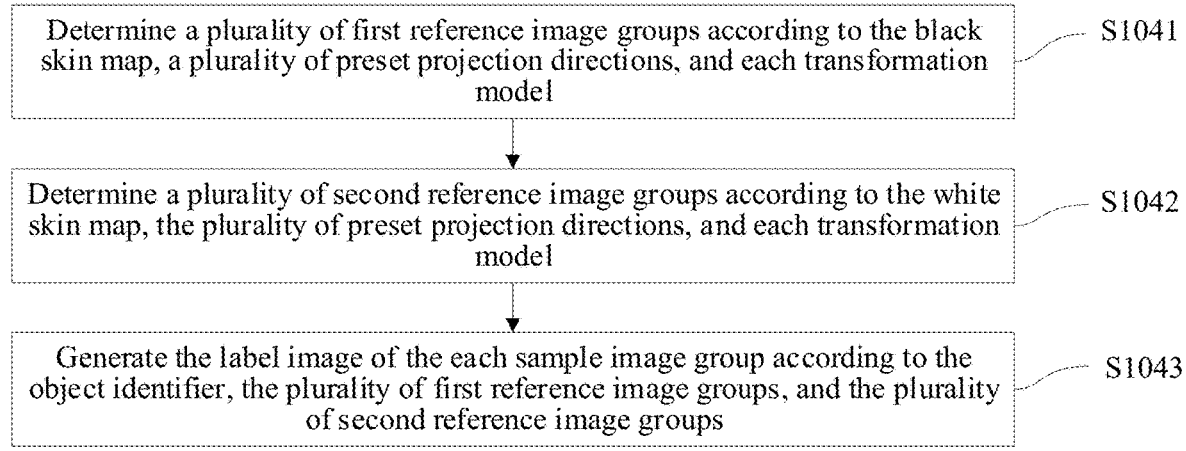
FIG. 2B is a flowchart of generating a label image of the each sample image group according to the object identifier, the plurality of solid-color skin maps, and the transformation model in step S104 according to an embodiment of this application.

In some embodiments, the plurality of solid-color skin maps include a black skin map and a white skin map. FIG. 2B is a flowchart of generating a label image of the each sample image group according to the object identifier, the plurality of solid-color skin maps, and the transformation model in step S104. As shown in FIG. 2B, step S104 may specifically include the following steps:

S1041: Determine a plurality of first reference image groups according to the black skin map, a plurality of preset projection directions, and each transformation model.

S1042: Determine a plurality of second reference image groups according to the white skin map, the plurality of preset projection directions, and each transformation model.

S1043: Generate the label image of the each sample image group according to the object identifier, the plurality of first reference image groups, and the plurality of second reference image groups.

In this embodiment, game objects may be separately filled in black and white, and a first reference image group is generated based on different projection directions (such as left, middle, and right) of the same black game object at the same orientation angle (for example, 330°), and a second reference image group is generated based on different projection directions of the same white game object at the same orientation angle.

Reference images in the same first reference image group or second reference image group may be named according to a specific rule. For example, if an object identifier is 075, an orientation angle O is 30°, P represents preset projection directions (such as LEFT, MIDDLE, and RIGHT), and N0 represents a black skin map or a white skin map (such as black or white), a naming format of the first reference image group may be 075_N0_black_O_30°_P_{LEFT, MIDDLE, RIGHT}, where a naming format of a single first reference image may be 075_N0_black_O_30°_P_zz, zz being any one of {LEFT, MIDDLE, RIGHT}, and a naming format of a single second reference image group may be 075_N0_white_O_30°_P_yy, yy being any one of {LEFT, MIDDLE, RIGHT}.

Methods for generating the first reference image group and the second reference image group are similar. Only a process of generating the first reference image group is described in detail herein, and a process of generating the second reference image group is not described again.

Figure 2C:
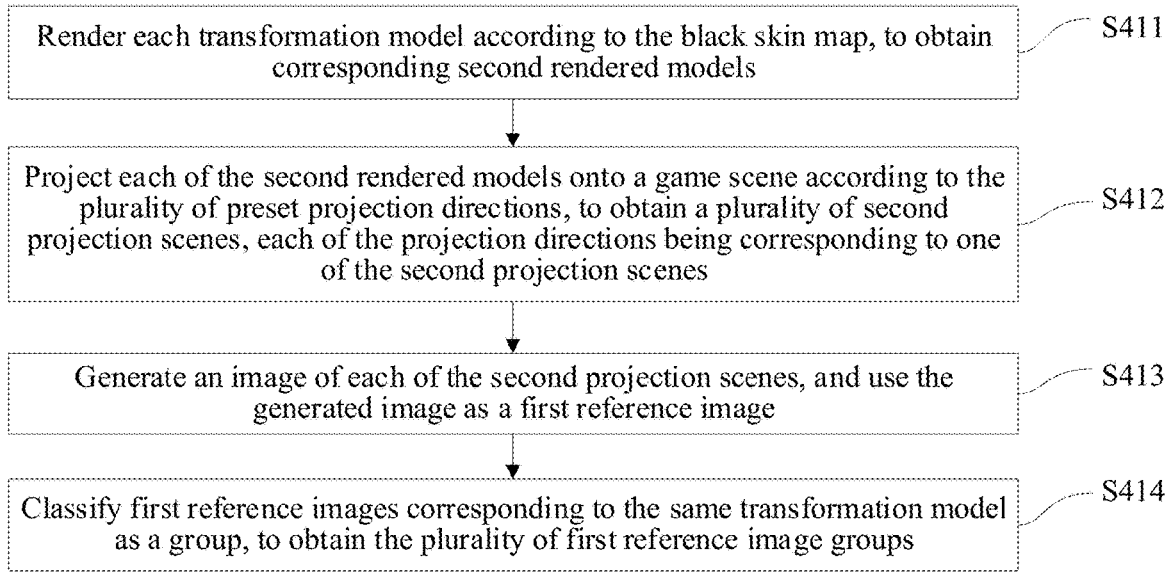
FIG. 2C is a flowchart of determining a plurality of first reference image groups according to the black skin map, a plurality of preset projection directions, and the transformation model in step S1041 according to an embodiment of this application.

FIG. 2C is a flowchart of determining a plurality of first reference image groups according to the black skin map, a plurality of preset projection directions, and the transformation model in step S1041. As shown in FIG. 2C, step S1041 specifically includes the following steps:

Step S411: Render each transformation model according to the black skin map, to obtain a plurality of corresponding second rendered models.

Step S412: Project each of the second rendered models onto a game scene according to the plurality of preset projection directions, to obtain a plurality of second projection scenes, each of the projection directions being corresponding to one of the second projection scenes.

Step S413: Generate an image of each of the second projection scenes, and use the generated image as a first reference image.

Step S414: Classify first reference images corresponding to the same transformation model as a group, to obtain the plurality of first reference image groups.

In this embodiment, the second rendered model is obtained by rendering a transformation model with the black skin map as a texture. Coordinates of the second rendered model may be updated based on a coordinate system of the game scene, to project the second rendered model onto the game scene. Subsequently, a three-dimensional second projection scene may be outputted as a two-dimensional image by using a screen recording function of preset software, for example, unity3D software, to obtain a first reference image.

Figure 2D:
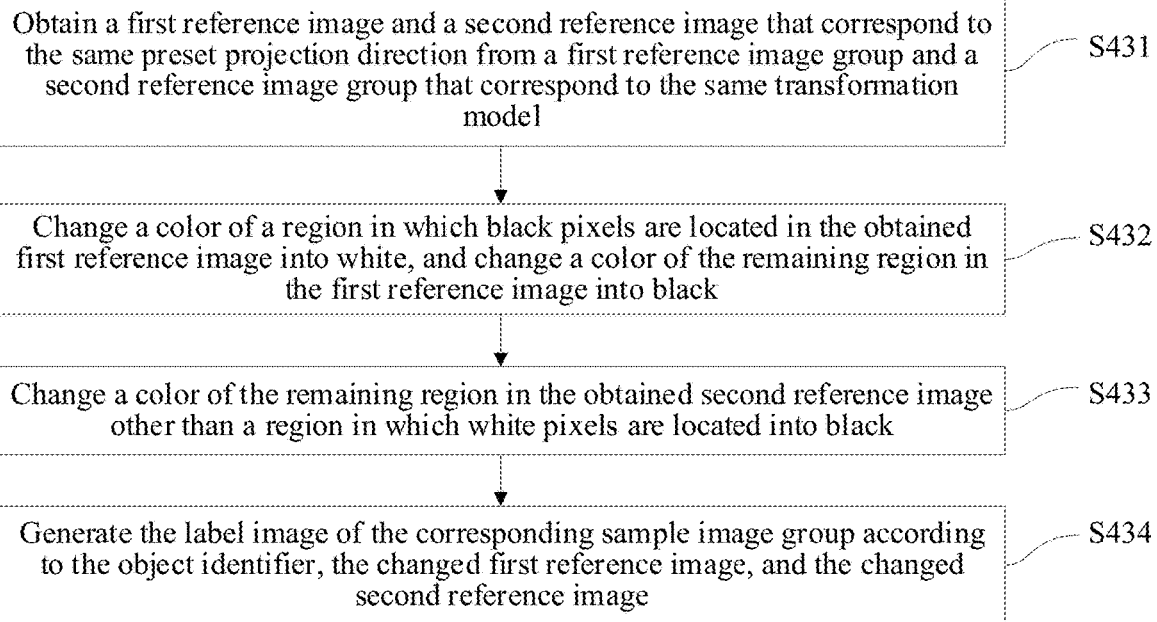
FIG. 2D is a flowchart of generating the label image of the each sample image group according to the object identifier, the plurality of first reference image groups, and the plurality of second reference image groups in step S1043 according to an embodiment of this application.

FIG. 2D is a flowchart of generating the label image of the each sample image group according to the object identifier, the plurality of first reference image groups, and the plurality of second reference image groups in step S1043. As shown in FIG. 2D, the step S1043 may specifically include the following steps:

Step S431: Obtain a first reference image and a second reference image that correspond to the same preset projection direction from a first reference image group and a second reference image group that correspond to the same transformation model.

Step S432: Change a color of a region in which black pixels are located in the obtained first reference image into white, and change a color of the remaining region in the first reference image into black.

Step S433: Change a color of the remaining region in the obtained second reference image other than a region in which white pixels are located into black.

Step S434: Generate the label image of the corresponding sample image group according to the object identifier, the changed first reference image, and the changed second reference image.

In this embodiment, after colors of the first reference image and the second reference image are changed, it can be ensured that game characters are all displayed in white on the two reference images. However, because a white region inevitably exists in the sky, and some things (for example, buildings) on a game map other than the game characters may be displayed in black, all these interfere with recognition of the game objects, consequently affecting the accuracy of object segmentation. Therefore, the interference factors need to be filtered out.

Figure 2E:
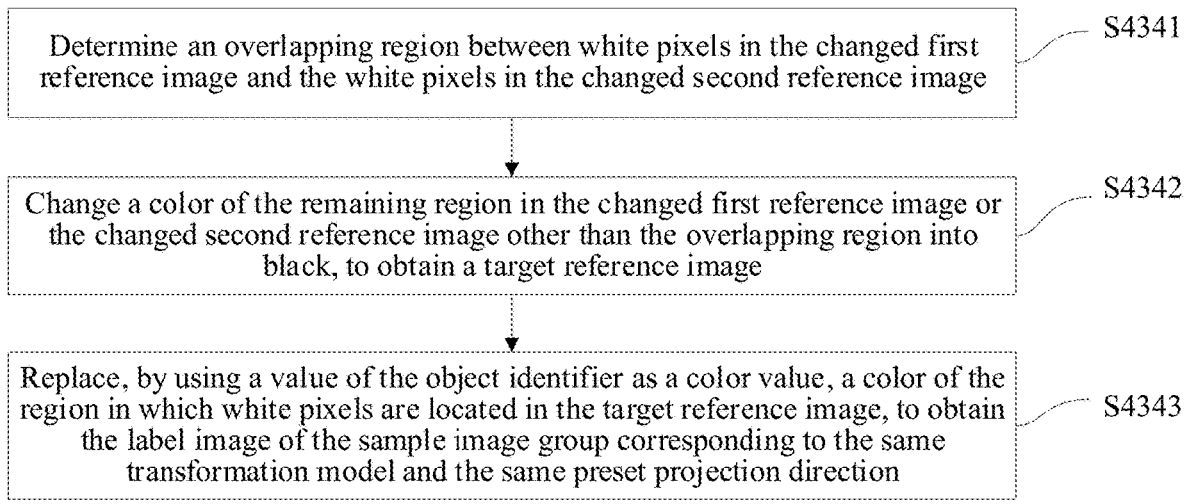
FIG. 2E is a flowchart of generating the label image of the corresponding sample image group according to the object identifier, the changed first reference image, and the changed second reference image in step S434 according to an embodiment of this application.

FIG. 2E is a flowchart of generating the label image of the corresponding sample image group according to the object identifier, the changed first reference image, and the changed second reference image in step S434. As shown in FIG. 2E, step S434 includes the following steps:

Step S4341: Determine an overlapping region between white pixels in the changed first reference image and the white pixels in the changed second reference image.

Step S4342: Change a color of the remaining region in the changed first reference image or the changed second reference image other than the overlapping region into black, to obtain a target reference image.

Step S4343: Replace, by using a value of the object identifier as a color value, a color of the region in which white pixels are located in the target reference image, to obtain the label image of the sample image group corresponding to the same transformation model and the same preset projection direction.

In this embodiment, interference things inevitably exist in the first reference image and the second reference image, which affect recognition of contours of the game objects. However, because there is a high probability that the interference things of the two reference images are different things, when the two reference images are attached to each other, a non-overlapping region is usually a region in which the interference things are located, and an overlapping region is a region in which the game objects are located. Therefore, contours of the game objects are well recognized, and subsequently colors of the recognized object contours are filled as values of object identifiers, so that the contours and the object identifiers can be well associated.

S105: Generate a training sample of the to-be-trained object according to the label image and the each sample image group, to train the semantic segmentation model by using the training sample of the to-be-trained object.

In this embodiment, each sample image and a corresponding label image may be used as a training sample. Generally, different sample images in the same sample image group all correspond to the same label image. For example, for a sample image group 075_N1_{001, 002, . . . 256}_O_30°_P_LEFT, a corresponding label image thereof may be 075_O_30°_P_LEFT. That is, an association relationship between the sample image group and the corresponding label image is established for the same game object, orientation angle, and preset projection direction.

Figure 2F:
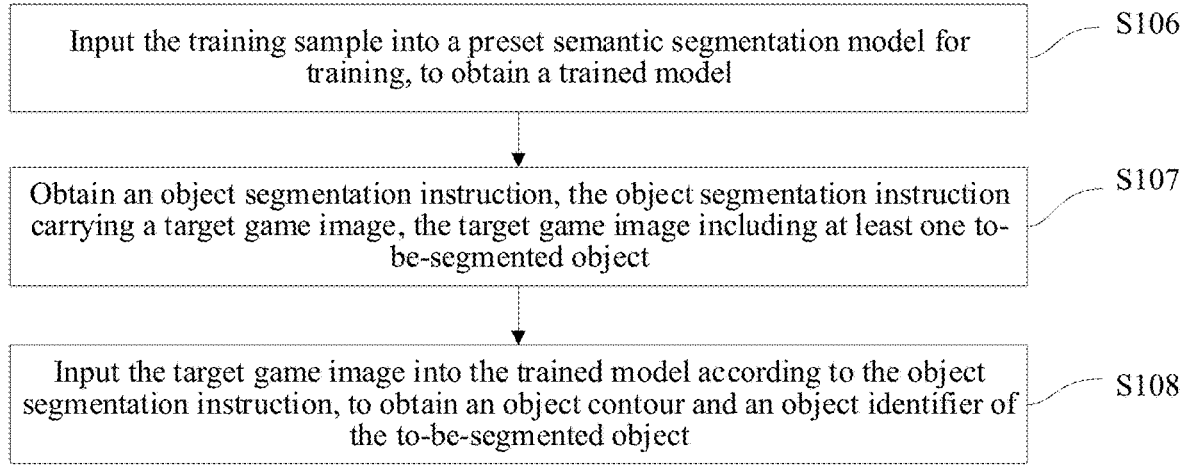
FIG. 2F is a flowchart of a method for generating a training sample according to an embodiment of this application.

In addition, after a training sample of a game object is generated, the training sample may be used to train a deep learning model, to facilitate subsequently recognizing the game object by using the trained model. FIG. 2F is a flowchart of a method for generating a training sample. As shown in FIG. 2F, after step S105, the method for generating a training sample may further include the following steps:

Step S106: Input the training sample into a preset semantic segmentation model for training, to obtain a trained model.

Step S107: Obtain an object segmentation instruction, the object segmentation instruction carrying a target game image, the target game image including at least one to-be-segmented object.

Step S108: Input the target game image into the trained model according to the object segmentation instruction, to obtain an object contour and an object identifier of the to-be-segmented object.

In this embodiment, the semantic segmentation model may include a fully convolutional network (FCN) model, a SegNet model, a Unet model, or the like. When the user intends to recognize which game objects (namely, to-be-segmented objects) are on a game image, the game image may be inputted into the trained model as a target game image, to determine a shape, a contour, and an object identifier of each game object on the game image, thereby obtaining the game object through segmentation.

Figure 2G:
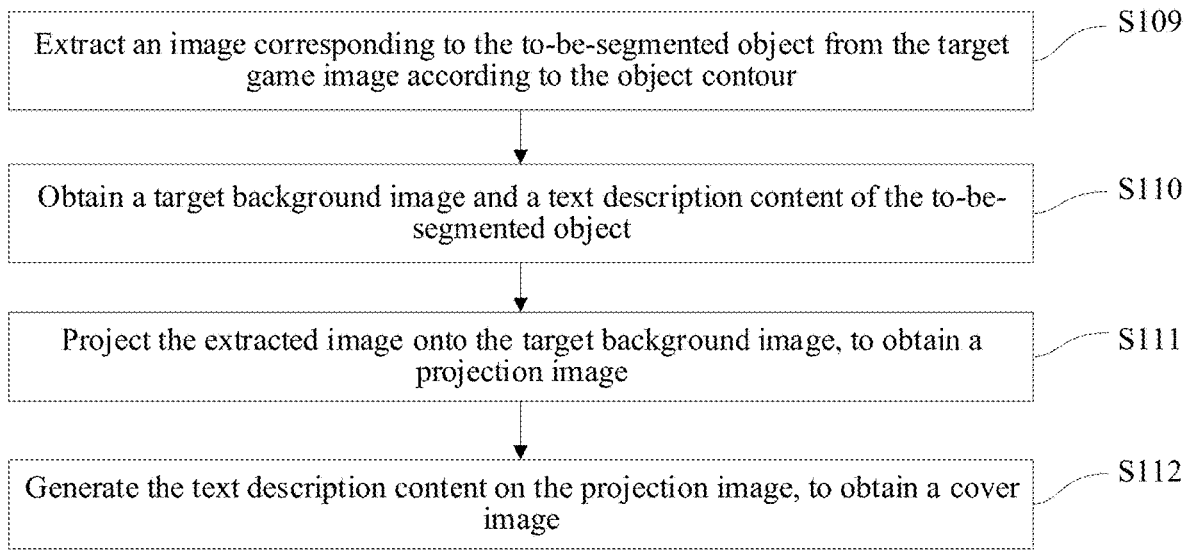
FIG. 2G is a flowchart of a method for generating a training sample according to an embodiment of this application.

In addition, after the game image is segmented to obtain a game object, a propaganda poster may be generated based on the game object. FIG. 2G is a flowchart of a method for generating a training sample. As shown in FIG. 2G, after the object contour and the object identifier of the to-be-segmented object are obtained, the method for generating a training sample may further include the following steps:

Step S109: Extract an image corresponding to the to-be-segmented object from the target game image according to the object contour.

Step S110: Obtain a target background image and a text description content of the to-be-segmented object.

Step S111: Project the extracted image onto the target background image, to obtain a projection image.

Step S112: Generate the text description content on the projection image, to obtain a cover image.

In this embodiment, the target background image may be extracted from the game scene, or may be specially designed. The text description content is mainly used for describing typical characteristic information of the to-be-segmented object, such as a skill effect and an object type. The cover image generated based on the to-be-segmented object, the target background image, and the text description content can be used to make a game promotion poster, a game strategy, and the like.

It can be learned from above that, according to the method for generating a training sample provided in this application, an object identifier of a to-be-trained object and a model file corresponding to the object identifier are obtained, the model file including a three-dimensional model and a skin map set, the skin map set including a plurality of solid-color skin maps and a plurality of colorful skin maps; subsequently transformation models corresponding to the three-dimensional model at different orientation angles are determined, each of the orientation angles being corresponding to one of the transformation models; a plurality of sample image groups are generated according to the plurality of colorful skin maps and the transformation model; subsequently a label image of the each sample image group is generated according to the object identifier, the plurality of solid-color skin maps, and the transformation model; and a training sample of the to-be-trained object is generated according to the label image and the each sample image group, so that sample images and the label image can be automatically generated without manual screenshots and labeling. The method is convenient, and has high sample generation efficiency and good generation effects.

According to the method described in the foregoing embodiments, the method for generating a training sample is applied to a server below. A detailed description is made by using an example in which the server is a backend server of the game Honor of Kings.

Figure 4:
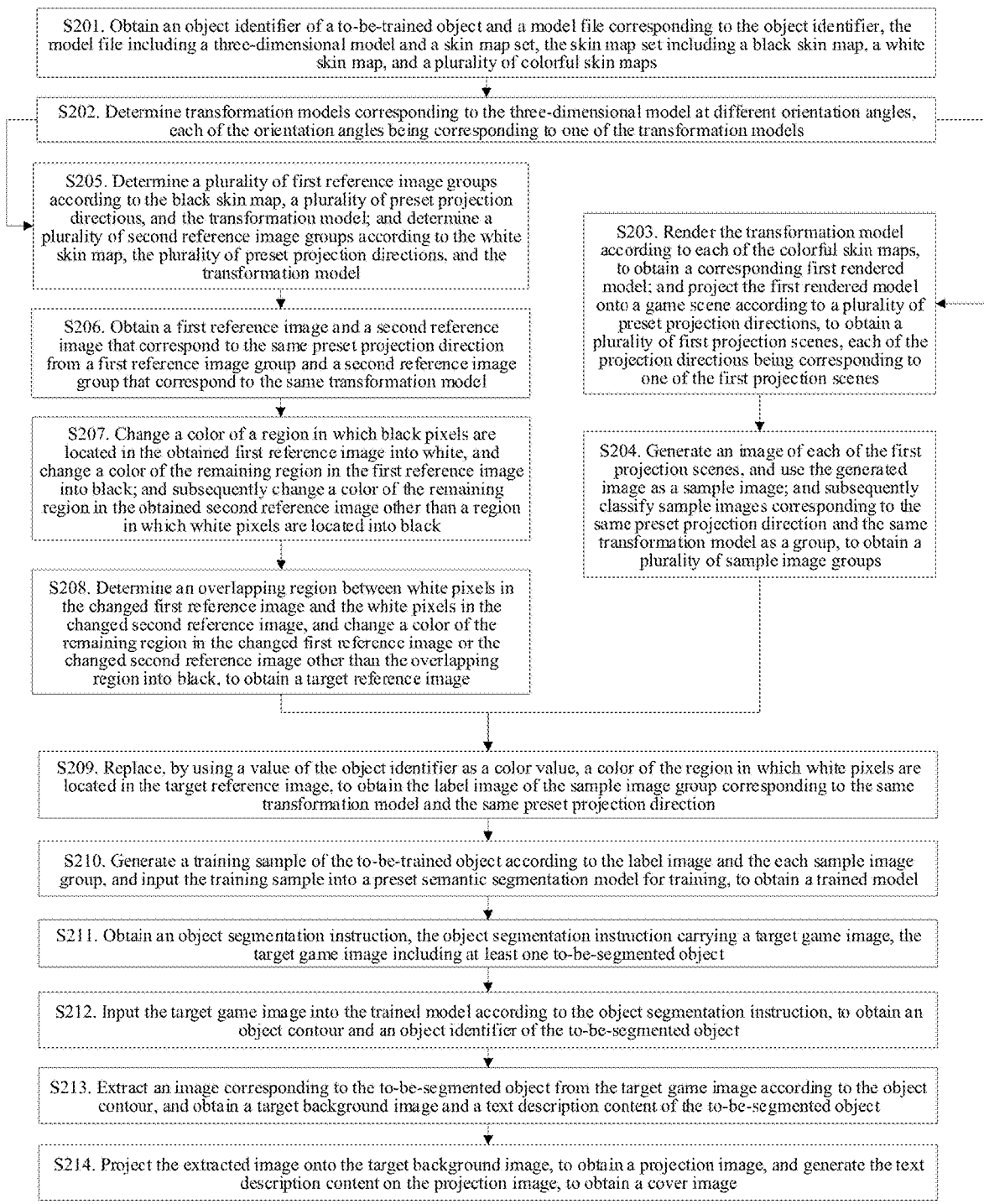
FIG. 4 is another schematic flowchart of a method for generating a training sample according to an embodiment of this application.
Figure 5:
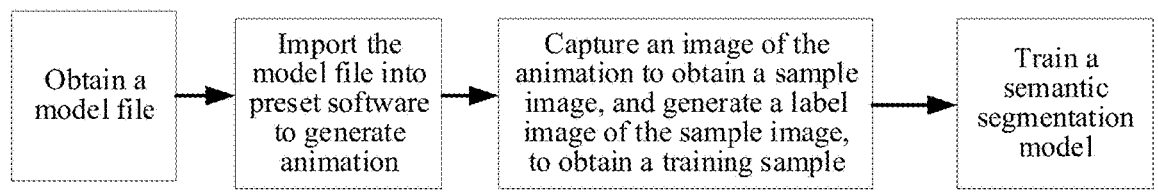
FIG. 5 is a schematic framework diagram of a training sample generation procedure according to an embodiment of this application.

FIG. 4 is a schematic flowchart of a method for generating a training sample according to an embodiment of this application. FIG. 5 is a schematic framework diagram of a training sample generation procedure according to an embodiment of this application. The method for generating a training sample includes the following steps:

S201: Obtain an object identifier of a to-be-trained object and a model file corresponding to the object identifier, the model file including a three-dimensional model and a skin map set, the skin map set including a black skin map, a white skin map, and a plurality of colorful skin maps.

For example, the colorful skin maps may be generated by randomly selecting four colors from a 256-color palette each time, and a quantity of the colorful skin maps may be 256. The black skin map refers to a solid-color skin map in completely black, and the white skin map refers to a solid-color skin map in completely white. The three-dimensional model refers to a coordinate model formed by three-dimensional coordinate points, and is used for describing a shape and a contour of the game object.

The model file may be automatically obtained by a system. That is, before step S201, the method for generating a training sample further includes:

determining an installation path of a game application;
determining a plurality of storage files with file suffixes of a preset character string according to the installation path;
grouping the plurality of storage files according to file names of the storage files, to obtain a plurality of storage file groups, file names of each of the storage file groups including a name of the same game object;
determining an object identifier of each game object; and
extracting a model file from a storage file group corresponding to the each game object, and copying and saving the model file and the object identifier.

Figure 3:
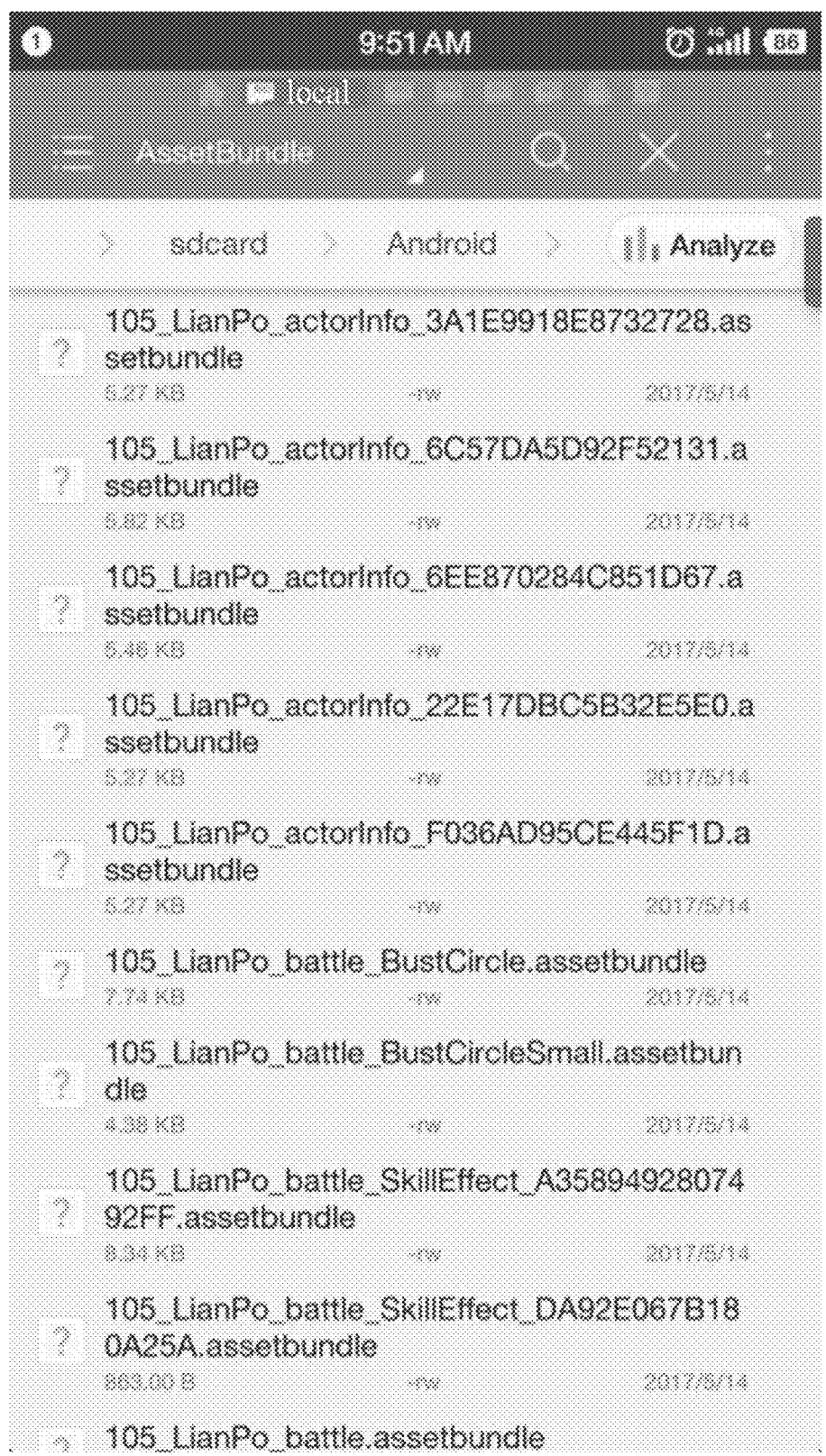
FIG. 3 is a schematic diagram showing some storage files in a package according to an embodiment of this application.

For example, some storage files at the storage location may be shown in FIG. 3, where the installation path may be . . . //com.tencent.tmgp.sgame/files/Resources/AssetBundle/, and the preset character string may be ".assetbundle". It can be seen from FIG. 3 that storage files displayed in the current page all have the same name "LianPo", that is, all the storage files are associated files of a game object "LianPo"; and an object identifier of "LianPo" is 105.

S202: Determine transformation models corresponding to the three-dimensional model at different orientation angles, each of the orientation angles being corresponding to one of the transformation models.

S203: Render the transformation model according to each of the colorful skin maps, to obtain a corresponding first rendered model; and project the first rendered model onto a game scene according to a plurality of preset projection directions, to obtain a plurality of first projection scenes, each of the projection directions being corresponding to one of the first projection scenes.

S204: Generate an image of each of the first projection scenes, and use the generated image as a sample image; and subsequently classify sample images corresponding to the same preset projection direction and the same transformation model as a group, to obtain a plurality of sample image groups.

For example, an angle may be selected from 0° to 360° every 30° as an orientation angle, so that there are 12 orientation angles, such as 0°, 30°, or 60°. The preset projection directions may include LEFT, MIDDLE, and RIGHT. Animation of the first projection scene is generated by using preset software, for example, unity3D software, and an image of the animation is captured by using a screenshot function. The captured image is the sample image.

If an object identifier is 075, the orientation angle O is 30°, and the projection direction P is LEFT, a naming format of the sample image group may be 075_N1_{001, 002, . . . 256}_O_30°_P_LEFT, and a naming format of sample images in the sample image group may be: 075_N1_xx_O_30°_P_LEFT, where N1 represents a colorful skin map, and assuming that there are 256 colorful skin maps, which may be sequentially marked as 001-256, xx is any value of {001, 002, . . . 256}, for example, 002.

S205: Determine a plurality of first reference image groups according to the black skin map, a plurality of preset projection directions, and the transformation model; and determine a plurality of second reference image groups according to the white skin map, the plurality of preset projection directions, and the transformation model.

For example, if an object identifier is 075, an orientation angle O is 30°, P represents preset projection directions (such as LEFT, MIDDLE, and RIGHT), and N0 represents a black skin map or a white skin map (such as black or white), a naming format of the first reference image group may be 075_N0_black_O_30°_P_{LEFT, MIDDLE, RIGHT}, where a naming format of a single first reference image may be 075_N0_black_O_30°_P_zz, zz being any one of {LEFT, MIDDLE, RIGHT}, and a naming format of a single second reference image group may be 075_N0_white_O_30°_Pyy, yy being any one of {LEFT, MIDDLE, RIGHT}.

Methods for generating the first reference image group, the second reference image group, and the sample image group are similar. Only a process of generating the first reference image group is described in detail herein, and a process of generating the second reference image group is not described again.

For example, the foregoing step of determining a plurality of first reference image groups according to the black skin map, a plurality of preset projection directions, and the transformation model specifically includes:

rendering the transformation model according to the black skin map, to obtain a corresponding second rendered model;
projecting the second rendered model onto the game scene according to the plurality of preset projection directions, to obtain a plurality of second projection scenes, each of the projection directions being corresponding to one of the second projection scenes;
generating an image of each of the second projection scenes, and use the generated image as a first reference image; and
classifying first reference images corresponding to the same transformation model as a group, to obtain the plurality of first reference image groups.

S206: Obtain a first reference image and a second reference image that correspond to the same preset projection direction from a first reference image group and a second reference image group that correspond to the same transformation model.

S207: Change a color of a region in which black pixels are located in the obtained first reference image into white, and change a color of the remaining region in the first reference image into black; and subsequently change a color of the remaining region in the obtained second reference image other than a region in which white pixels are located into black.

S208: Determine an overlapping region between white pixels in the changed first reference image and the white pixels in the changed second reference image, and change a color of the remaining region in the changed first reference image or the changed second reference image other than the overlapping region into black, to obtain a target reference image.

S209: Replace, by using a value of the object identifier as a color value, a color of the region in which white pixels are located in the target reference image, to obtain the label image of the sample image group corresponding to the same transformation model and the same preset projection direction.

For example, colors of a first reference image 075_N0_black_O_30°_P_LEFT and a second reference image 075_N0_white_O_30°_P_LEFT may be changed, and the two changed reference images are overlapped; subsequently a color of a region other than the overlapping region is changed into black, and a color value (namely, an RGB value) of the overlapping region is changed into 075, to obtain a label image 075_O_30°_P_LEFT; and the label image is used as a label image of a sample image group 075_N1_{001, 002, . . . 256}_O_30°_P_LEFT.

S210: Generate a training sample of the to-be-trained object according to the label image and the each sample image group, and input the training sample into a preset semantic segmentation model for training, to obtain a trained model.

S211: Obtain an object segmentation instruction, the object segmentation instruction carrying a target game image, the target game image including at least one to-be-segmented object.

S212: Input the target game image into the trained model according to the object segmentation instruction, to obtain an object contour and an object identifier of the to-be-segmented object.

Figure 6:
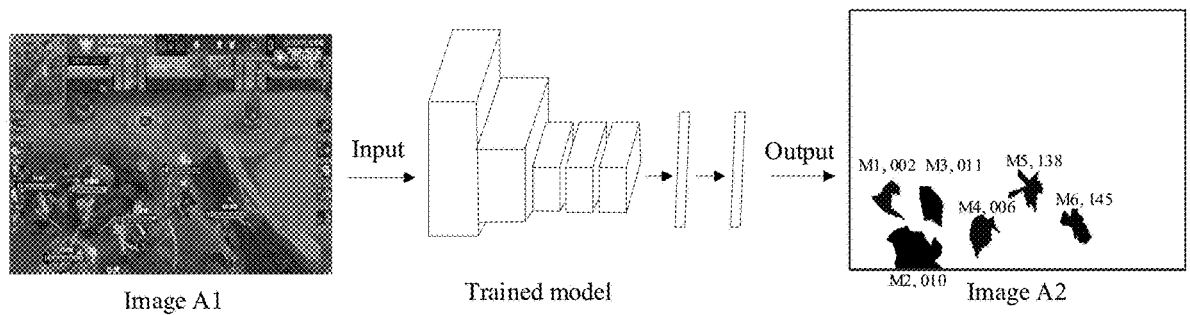
FIG. 6 is a schematic diagram of a comparison between an image before model processing and an image after model processing according to an embodiment of this application.

For example, FIG. 6 shows an input image (that is, the target game image) A1 and an output image A2 of the trained model. Six to-be-segmented objects M1 to M6 are clearly drawn on A2, and a color value of each to-be-segmented object is an object identifier thereof. The color values may be sequentially, for example, 002, 010, 011, 006, 138, 145 from left to right.

S213: Extract an image corresponding to the to-be-segmented object from the target game image according to the object contour, and obtain a target background image and a text description content of the to-be-segmented object.

S214: Project the extracted image onto the target background image, to obtain a projection image, and generate the text description content on the projection image, to obtain a cover image.

Figure 7:
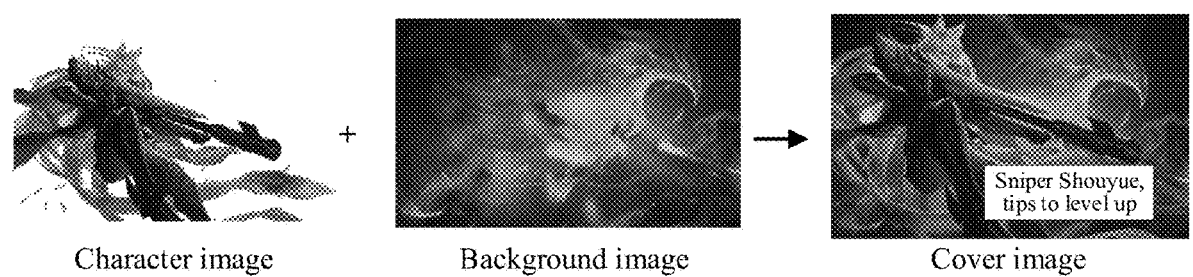
FIG. 7 is a schematic flowchart of a cover image generation process according to an embodiment of this application.

For example, FIG. 7 shows a cover image of a hero "Baili Shouyue" in the game Honor of Kings. In a generation process of the cover image, a character image of "Baili Shouyue" needs to be obtained through segmentation by using the trained model. Subsequently, the character image is superimposed on a prepared background image, and may be superimposed at any position of the background image. For example, a description box is generated at a lower right position, and a text description content, for example, "Sniper Shouyue, tips to level up", of the hero "Baili Shouyue" is generated in the description box.

According to the method described in the foregoing embodiments, this embodiment further provides a description from the perspective of an apparatus for generating a training sample. The apparatus for generating a training sample may be specifically implemented as an independent entity, or may be integrated in an electronic device.

Figure 8:
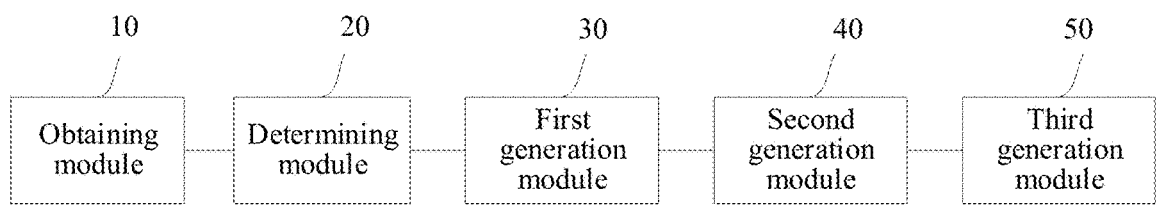
FIG. 8 is a schematic structural diagram of an apparatus for generating a training sample according to an embodiment of this application.

FIG. 8 specifically describes an apparatus for generating a training sample of a semantic segmentation model according to an embodiment of this application. The apparatus is applicable to an electronic device. The semantic segmentation model is configured to segment an image to obtain an object. The apparatus for generating a training sample of a semantic segmentation model may include: an obtaining module 10, a determining module 20, a first generation module 30, a second generation module 40, and a third generation module 50.

(1) Obtaining Module 10

The obtaining module 10 is configured to obtain an object identifier of a to-be-trained object and a model file corresponding to the object identifier, the model file including a three-dimensional model of the to-be-trained object and a skin map set, the skin map set including a plurality of solid-color skin maps and a plurality of colorful skin maps.

In this embodiment, the object identifier is a code manually generated by a user or automatically generated by a system for each game object (including the to-be-trained object), and is used for uniquely identifying the game object in a game. Skin maps in the skin map set are texture maps. The colorful skin maps may be generated by randomly selecting four colors from a 256-color palette each time, and a quantity of the colorful skin maps may be 256. The plurality of solid-color skin maps refer to texture maps with a single color, and may include a black skin map and a white skin map. The black skin map refers to a solid-color skin map in completely black, and the white skin map refers to a solid-color skin map in completely white. The three-dimensional model refers to a coordinate model formed by three-dimensional coordinate points, and is used for describing a shape and a contour of the game object. Generally, different game objects have different three-dimensional models.

The model file may be manually inputted by the user, for example, manually extracted from a game package, or may be automatically obtained by the system. That is, the obtaining module 10 may further be configured to:

before the obtaining an object identifier of a to-be-trained object and a model file corresponding to the object identifier, determine an installation path of a game application;

determine a plurality of storage files with file suffixes of a preset character string according to the installation path;

group the plurality of storage files according to file names of the storage files, to obtain a plurality of storage file groups, file names of each of the storage file groups including a name of the same game object;

determine an object identifier of each game object; and extract a model file from a storage file group corresponding to the each game object, and copy and save the model file and the object identifier.

In this embodiment, after the game application is installed, a storage location of the package may be found based on the installation path, and all storage files with suffixes of the preset character string at the storage location are extracted; the storage files are grouped according to names of game objects, and storage files of the same game object are classified as the same group. For example, some storage files at the storage location may be shown in FIG. 3, where the installation path may be . . . //com.tencent.tmgp.sgame/files/Resources/AssetBundle/, and the preset character string may be ".assetbundle". It can be seen from FIG. 3 that storage files displayed in the current page all have the same name "LianPo", that is, all the storage files are associated files of a game object "LianPo"; and an object identifier of "LianPo" is 105.

(2) Determining Module 20

The determining module 20 is configured to determine transformation models corresponding to the three-dimensional model at different orientation angles, each of the orientation angles being corresponding to one of the transformation models.

In this embodiment, the orientation angle may be manually preset. For example, an angle may be selected from 0° to 360° every 30° as an orientation angle, so that there are 12 orientation angles, such as 0°, 30°, or 60°. Correspondingly, the transformation model is a model obtained after the three-dimensional model rotates 0°, 30°, or 60° from a default angle.

(3) First Generation Module 30

The first generation module 30 is configured to generate a plurality of sample image groups corresponding to each transformation model according to the plurality of colorful skin maps and each transformation model, each of the sample image groups including a plurality of sample images.

For example, the first generation module 30 is specifically configured to:

render each transformation model according to each of the colorful skin maps, to obtain a plurality of corresponding first rendered models;
  project each of the first rendered models onto a game scene according to a plurality of preset projection directions, to obtain a plurality of first projection scenes, each of the projection directions being corresponding to one of the first projection scenes;
  generate an image of each of the first projection scenes, and use the generated image as a sample image; and
  classify sample images corresponding to the same preset projection direction and the same transformation model as a group, to obtain the plurality of sample image groups.

In this embodiment, the first rendered model is obtained by rendering a transformation model with a colorful skin map as a texture. The preset projection directions may be manually set. Because a deep learning network has translation invariance, it is unnecessary to generate images in a large quantity of positions, and only images in a left direction, a middle direction, and a right direction need to be generated. That is, the projection directions may be set to three types: a left region, a middle region, and a right region. The game scene is a three-dimensional scene. Coordinates of the first rendered model may be updated based on a coordinate system of the game scene, to project the first rendered model onto the game scene. Subsequently, a three-dimensional first projection scene may be outputted as a two-dimensional image by using a screen recording function of preset software, for example, unity3D software, to obtain a sample image. That is, animation of the first projection scene is generated by using the preset software, for example, unity3D software, and an image of the animation is captured by using a screenshot function. The captured image is the sample image.

Sample images that are in the same projection direction, at the same orientation angle, and of the same game object may be classified as one group. For example, if an object identifier is 075, the orientation angle O is 30°, and the projection direction P is LEFT, a naming format of the sample image group may be 075_N1_{001, 002, . . . 256}_O_30°_P_LEFT, and a naming format of sample images in the sample image group may be: 075_N1_xx_O_30°_P_LEFT, where N1 represents a colorful skin map, and assuming that there are 256 colorful skin maps, which may be sequentially marked as 001-256, xx is any value of {001, 002, . . . 256}, for example, 002.

(4) Second Generation Module 40

The second generation module 40 is configured to generate a label image of the each sample image group according to the object identifier, the plurality of solid-color skin maps, and each transformation model, the label image being used for labeling the sample images in the each sample image group.

In this embodiment, the label image is used for labeling the sample images in the sample image group, for example, labeling a contour, an appearance, and an object identifier of a game object on a sample image. For sample images in the same sample image group, the same label image is used. Currently, a sample image is labeled through a manual operation, which has low efficiency.

Figure 9:
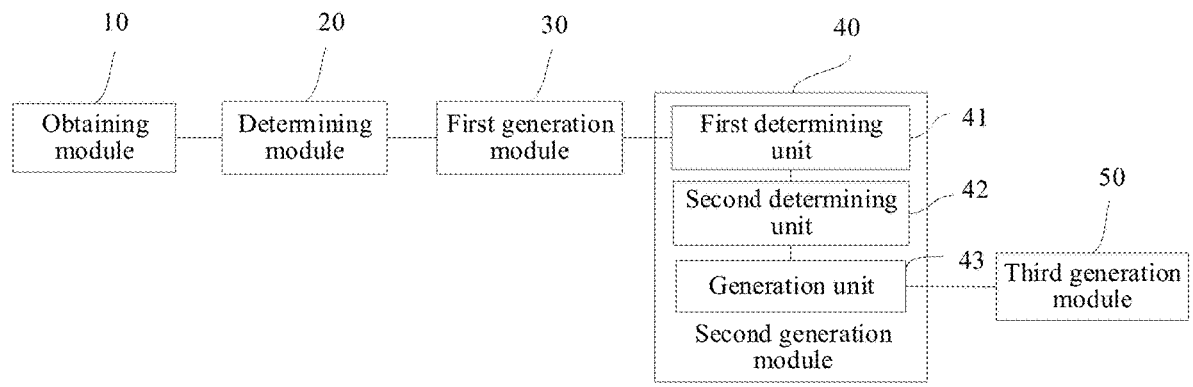
FIG. 9 is another schematic structural diagram of an apparatus for generating a training sample according to an embodiment of this application.

Referring to FIG. 9, the plurality of solid-color skin maps include a black skin map and a white skin map, and the second generation module 40 specifically includes:

a first determining unit 41, configured to determine a plurality of first reference image groups according to the black skin map, a plurality of preset projection directions, and each transformation model;
  a second determining unit 42, configured to determine a plurality of second reference image groups according to the white skin map, the plurality of preset projection directions, and each transformation model; and
  a generation unit 43, configured to generate the label image of the each sample image group according to the object identifier, the plurality of first reference image groups, and the plurality of second reference image groups.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In this embodiment, game objects may be separately filled in black and white, and a first reference image group is generated based on different projection directions (such as left, middle, and right) of the same black game object at the same orientation angle (for example, 330°), and a second reference image group is generated based on different projection directions of the same white game object at the same orientation angle.

Reference images in the same first reference image group or second reference image group may be named according to a specific rule. For example, if an object identifier is 075, an orientation angle O is 30°, P represents preset projection directions (such as LEFT, MIDDLE, and RIGHT), and N0 represents a black skin map or a white skin map (such as black or white), a naming format of the first reference image group may be 075_N0_black_O_30°_P_{LEFT, MIDDLE, RIGHT}, where a naming format of a single first reference image may be 075_N0_black_O_30°_P_zz, zz being any one of {LEFT, MIDDLE, RIGHT}, and a naming format of a single second reference image group may be 075_N0_white_O_30°_P_yy, yy being any one of {LEFT, MIDDLE, RIGHT}.

Methods for generating the first reference image group and the second reference image group are similar. Only a process of generating the first reference image group is described in detail herein, and a process of generating the second reference image group is not described again.

For example, the first determining unit 41 is specifically configured to:

render each transformation model according to the black skin map, to obtain a plurality of corresponding second rendered models;

project each of the second rendered models onto a game scene according to the plurality of preset projection directions, to obtain a plurality of second projection scenes, each of the projection directions being corresponding to one of the second projection scenes;

generate an image of each of the second projection scenes, and use the generated image as a first reference image; and classify first reference images corresponding to the same transformation model as a group, to obtain the plurality of first reference image groups.

In this embodiment, the second rendered model is obtained by rendering a transformation model with the black skin map as a texture. Coordinates of the second rendered model may be updated based on a coordinate system of the game scene, to project the second rendered model onto the game scene. Subsequently, a three-dimensional second projection scene may be outputted as a two-dimensional image by using a screen recording function of preset software, for example, unity3D software, to obtain a first reference image.

For example, the generation unit 43 is specifically configured to:

obtain a first reference image and a second reference image that correspond to the same preset projection direction from a first reference image group and a second reference image group that correspond to the same transformation model;

change a color of a region in which black pixels are located in the obtained first reference image into white, and change a color of the remaining region in the first reference image into black;

change a color of the remaining region in the obtained second reference image other than a region in which white pixels are located into black; and generate the label image of the corresponding sample image group according to the object identifier, the changed first reference image, and the changed second reference image.

In this embodiment, after colors of the first reference image and the second reference image are changed, it can be ensured that game characters are all displayed in white on the two reference images. However, because a white region inevitably exists in the sky, and some things (for example, buildings) on a game map other than the game characters may be displayed in black, all these interfere with recognition of the game objects, consequently affecting the accuracy of object segmentation. Therefore, the interference factors need to be filtered out.

Specifically, the generation unit 43 is specifically configured to:

determine an overlapping region between white pixels in the changed first reference image and the white pixels in the changed second reference image;

change a color of the remaining region in the changed first reference image or the changed second reference image other than the overlapping region into black, to obtain a target reference image; and replace, by using a value of the object identifier as a color value, a color of the region in which white pixels are located in the target reference image, to obtain the label image of the sample image group corresponding to the same transformation model and the same preset projection direction.

In this embodiment, interference things inevitably exist in the first reference image and the second reference image, which affect recognition of contours of the game objects. However, because there is a high probability that the interference things of the two reference images are different things, when the two reference images are attached to each other, a non-overlapping region is usually a region in which the interference things are located, and an overlapping region is a region in which the game objects are located. Therefore, contours of the game objects are well recognized, and subsequently colors of the recognized object contours are filled as values of object identifiers, so that the contours and the object identifiers can be well associated.

(5) Third Generation Module 50

The third generation module 50 is configured to generate a training sample of the to-be-trained object according to the label image and the each sample image group, to train the semantic segmentation model by using the training sample of the to-be-trained object.

In this embodiment, each sample image and a corresponding label image may be used as a training sample. Generally, different sample images in the same sample image group all correspond to the same label image. For example, for a sample image group 075_N1_{001, 002, . . . 256}_O_30° P_LEFT, a corresponding label image thereof may be 075_O_30°_P_LEFT. That is, an association relationship between the sample image group and the corresponding label image is established for the same game object, orientation angle, and preset projection direction.

Figure 10:
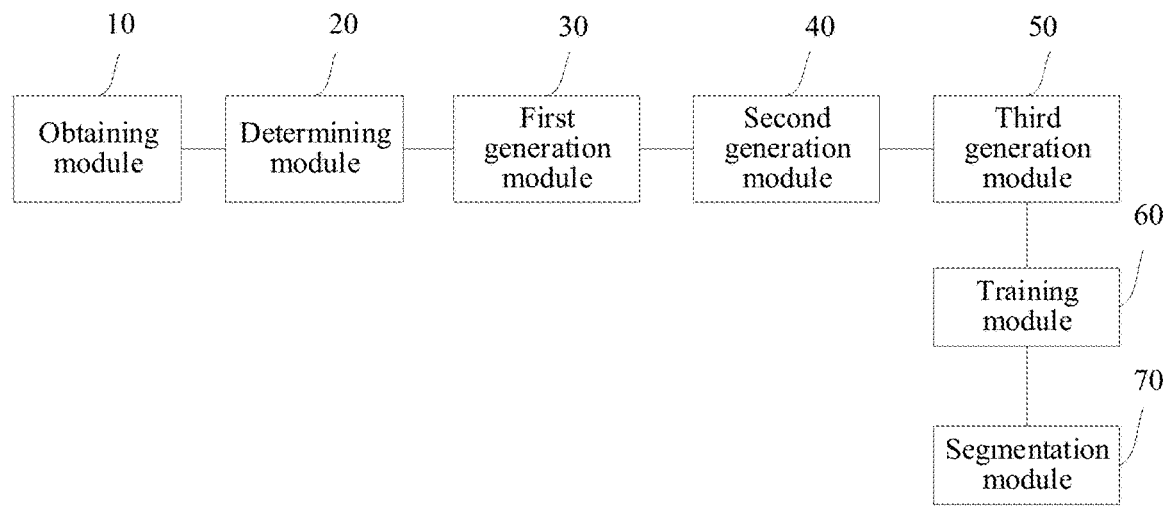
FIG. 10 is another schematic structural diagram of an apparatus for generating a training sample according to an embodiment of this application.

In addition, after a training sample of a game object is generated, the training sample may be used to train a deep learning model, to facilitate subsequently recognizing the game object by using the trained model. That is, referring to FIG. 10, the apparatus for generating a training sample further includes a training module 60 and a segmentation module 70.

The training module 60 is configured to: after the third generation module 50 generates the training sample of the to-be-trained object according to the label image and the each sample image group, input the training sample into a preset semantic segmentation model for training, to obtain a trained model.

The segmentation module 70 is configured to: obtain an object segmentation instruction, the object segmentation instruction carrying a target game image, the target game image including at least one to-be-segmented object; and input the target game image into the trained model according to the object segmentation instruction, to obtain an object contour and an object identifier of the to-be-segmented object.

In this embodiment, the semantic segmentation model may include an FCN model, a SegNet model, a Unet model, or the like. When the user intends to recognize which game objects (namely, to-be-segmented objects) are on a game image, the game image may be inputted into the trained model as a target game image, to determine a shape, a contour, and an object identifier of each game object on the game image, thereby obtaining the game object through segmentation.

In addition, after the game image is segmented to obtain a game object, a propaganda poster may be generated based on the game object. That is, the segmentation module 70 is further configured to:

after the segmentation module 70 obtains the object contour and the object identifier of the to-be-segmented object, extract an image corresponding to the to-be-segmented object from the target game image according to the object contour;

obtain a target background image and a text description content of the to-be-segmented object;

project the extracted image onto the target background image, to obtain a projection image; and generate the text description content on the projection image, to obtain a cover image.

In this embodiment, the target background image may be extracted from the game scene, or may be specially designed. The text description content is mainly used for describing typical characteristic information of the to-be-segmented object, such as a skill effect and an object type. The cover image generated based on the to-be-segmented object, the target background image, and the text description content can be used to make a game promotion poster, a game strategy, and the like.

During specific implementation, the foregoing units may be implemented as independent entities, or may be randomly combined, or may be implemented as one entity or several entities. For specific implementation of the foregoing units, reference may be made to the foregoing method embodiments. Details are not described herein again.

It can be learned from above that, according to the apparatus for generating a training sample provided in this embodiment, the obtaining module 10 obtains an object identifier of a to-be-trained object and a model file corresponding to the object identifier, the model file including a three-dimensional model and a skin map set, the skin map set including a plurality of solid-color skin maps and a plurality of colorful skin maps; subsequently the determining module 20 determines transformation models corresponding to the three-dimensional model at different orientation angles, each of the orientation angles being corresponding to one of the transformation models; the first generation module 30 generates a plurality of sample image groups according to the plurality of colorful skin maps and the transformation model; subsequently the second generation module 40 generates a label image of the each sample image group according to the object identifier, the plurality of solid-color skin maps, and the transformation model; and the third generation module 50 generates a training sample of the to-be-trained object according to the label image and the each sample image group, so that sample images and the label image can be automatically generated without manual screenshots and labeling. The method is convenient, and has high sample generation efficiency and good generation effects.

Correspondingly, the embodiments of this application further provide a system for generating a training sample, including any apparatus for generating a training sample provided in the embodiments of this application. The apparatus for generating a training sample may be integrated in an electronic device.

The electronic device may obtain an object identifier of a to-be-trained object and a model file corresponding to the object identifier, the model file including a three-dimensional model and a skin map set, the skin map set including a plurality of solid-color skin maps and a plurality of colorful skin maps; determine transformation models corresponding to the three-dimensional model at different orientation angles, each of the orientation angles being corresponding to one of the transformation models; generate a plurality of sample image groups according to the plurality of colorful skin maps and the transformation model; generate a label image of the each sample image group according to the object identifier, the plurality of solid-color skin maps, and the transformation model; and generate a training sample of the to-be-trained object according to the label image and the each sample image group.

For specific implementation of the foregoing devices, reference may be made to the foregoing embodiments. Details are not described herein again.

Because the system for generating a training sample may include any apparatus for generating a training sample provided in the embodiments of this application, the system for generating a training sample can implement beneficial effects that may be implemented by any apparatus for generating a training sample provided in the embodiments of this application. For details, reference may be made to the foregoing embodiments. Details are not described herein again.

Figure 11:
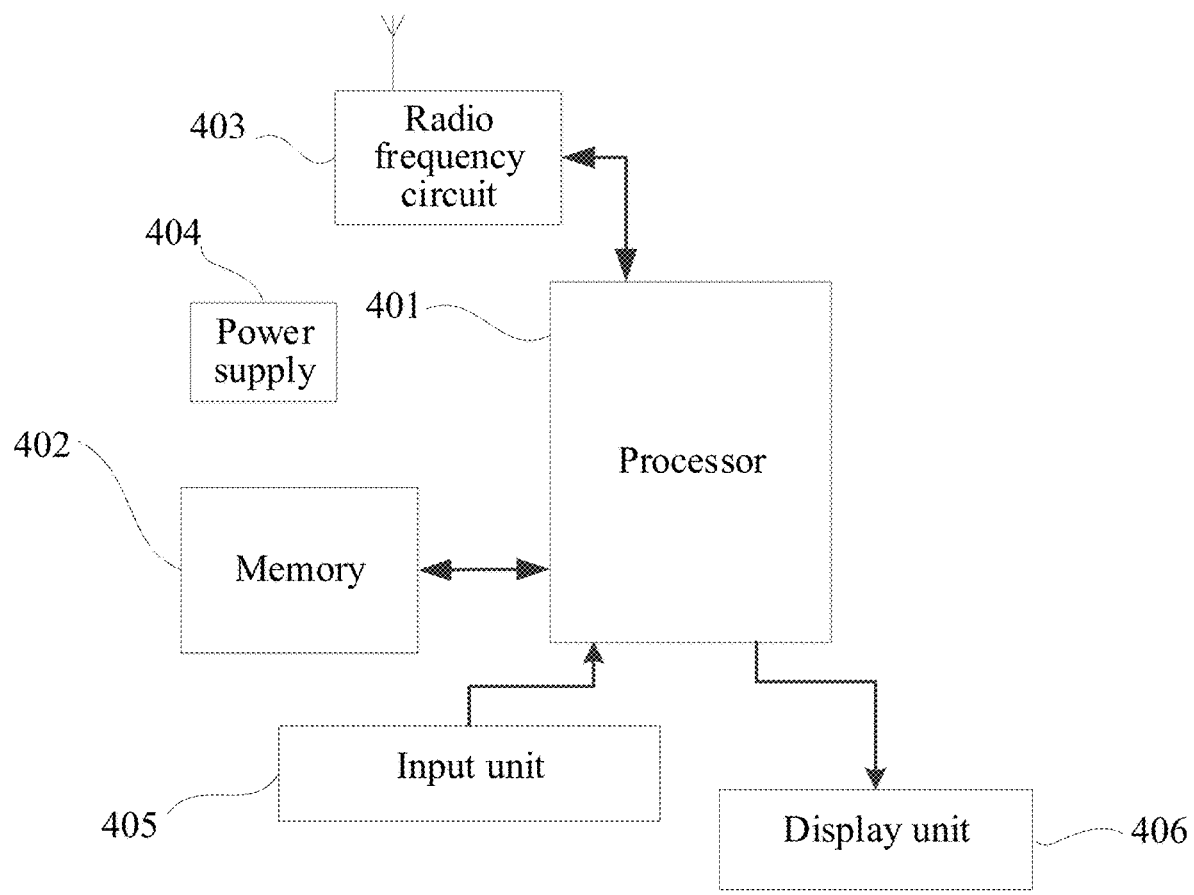
FIG. 11 is a schematic structural diagram of an electronic device according to an embodiment of this application.

Correspondingly, the embodiments of this application further provide an electronic device. FIG. 11 is a schematic structural diagram of an electronic device according to an embodiment of this application. Specifically:

The electronic device may include components such as a processor 401 including one or more processing cores, a memory 402 including one or more computer-readable storage media, a radio frequency (RF) circuit 403, a power supply 404, an input unit 405, and a display unit 406. A person skilled in the art may understand that the electronic device structure shown in FIG. 11 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. The processor 401 may include one or more processing cores. The processor 401 may integrate an application processor and a modem processor. The application processor mainly processes an operating system, a user interface, an application, and the like. The modem processor mainly processes wireless communication. It can be understood that the foregoing modem processor may alternatively not be integrated into the processor 401.

The memory 402 may be configured to store a software program and module, and the processor 401 runs the software program and module stored in the memory 402, to implement various functional applications and data processing. The memory 402 may mainly include a program storage area and a data storage area. The program storage area may store an operating system, an application required by at least one function (such as a sound playback function and an image display function), and the like. The data storage area may store data created according to use of the electronic device, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to allow the processor 401 to access the memory 402.

The RF circuit 403 may be configured to receive and transmit signals during an information receiving and transmitting process. Particularly, after receiving downlink information from a base station, the RF circuit delivers the downlink information to one or more processors 401 for processing, and transmits related uplink data to the base station. Generally, the RF circuit 403 includes but is not limited to, an antenna, at least one amplifier, a tuner, one or more oscillators, a subscriber identity module (SIM) card, a transceiver, a coupler, a low noise amplifier (LNA), duplexer, and the like. In addition, the RF circuit 403 may also communicate with a network and another device by wireless communication. The wireless communication may use any communication standard or protocol, including but not limited to, the Global System of Mobile Communications (GSM), general packet radio service (GPRS), and Code Division Multiple Access (CDMA), Wideband Code Division Multiple Access (WCDMA), Long Term Evolution (LTE), email, short messaging service (SMS), and the like.

The electronic device further includes the power supply 404 (for example, a battery) for supplying power to the components. The power supply 404 may logically connect to the processor 401 by using a power supply management system, thereby implementing functions such as charging, discharging, and power consumption management by using the power supply management system. The power supply 404 may further include one or more of a direct current or alternating current power supply, a re-charging system, a power failure detection circuit, a power supply converter or inverter, a power supply state indicator, and any other component.

The electronic device may further include the input unit 405. The input unit 405 may be configured to receive inputted numeric or character information and generate keyboard, mouse, joystick, optical, or trackball signal input related to user settings and function control. Specifically, in a specific embodiment, the input unit 405 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. The touch-sensitive surface may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 401. Moreover, the touch controller can receive and execute a command transmitted from the processor 401. In addition, the touch-sensitive surface may be implemented in a plurality of types, such as a resistive type, a capacitive type, an infrared type, and a surface acoustic wave type. In addition to the touch-sensitive surface, the input unit 405 may further include the another input device. Specifically, the another input device may include, but not limited to, one or more of a physical keyboard, a function key (such as a volume control key or a switch key), a trackball, a mouse, a joystick, and the like.

The electronic device may further include the display unit 406. The display unit 406 may be configured to display information entered by the user or information provided for the user, and various graphical user interfaces of the electronic device. The graphical user interfaces may be formed by a graph, text, an icon, a video, or any combination thereof. The display unit 406 may include a display panel. The display panel may be configured in the form of a liquid crystal display (LCD), an organic light-emitting diode (OLED), or the like. Further, the touch-sensitive surface may overlay the display panel. After detecting a touch operation on or near the touch-sensitive surface, the touch-sensitive surface transfers the touch operation to the processor 401 to determine a type of a touch event, and then the processor 401 provides corresponding visual output on the display panel according to the type of the touch event. Although, in FIG. 11, the touch-sensitive surface and the display panel are used as two separate components to implement input and output functions, in some embodiments, the touch-sensitive surface and the display panel may be integrated to implement the input and output functions.

Although not shown in the figure, the electronic device may further include a camera, a Bluetooth module, and the like, which are not described herein. Specifically, in this embodiment, the processor 401 of the electronic device may load, according to the following instructions, executable files corresponding to processes of one or more applications into the memory 402. The processor 401 runs the applications stored in the memory 402, to implement the various functions as follows:

obtaining an object identifier of a to-be-trained object and a model file corresponding to the object identifier, the model file including a three-dimensional model and a skin map set, the skin map set including a plurality of solid-color skin maps and a plurality of colorful skin maps;

determining transformation models corresponding to the three-dimensional model at different orientation angles, each of the orientation angles being corresponding to one of the transformation models;

generating a plurality of sample image groups according to the plurality of colorful skin maps and the transformation model;

generating a label image of the each sample image group according to the object identifier, the plurality of solid-color skin maps, and the transformation model; and generating a training sample of the to-be-trained object according to the label image and the each sample image group.

The electronic device can implement beneficial effects that may be implemented by any apparatus for generating a training sample provided in the embodiments of this application. For details, reference may be made to the foregoing embodiments. Details are not described herein again.

A person of ordinary skill in the art may understand that, all or some of the steps of the methods in the foregoing embodiments may be implemented by a program instructing relevant hardware. The program may be stored in a computer-readable storage medium. The storage medium may include: a read only memory (ROM), a random access memory (RAM), a magnetic disk, an optical disc, or the like.

The method and apparatus for generating a training sample, the storage medium, and the electronic device provided in the embodiments of this application are described above in detail. Although the principles and implementations of this application are described by using specific examples in this specification, the descriptions of the foregoing embodiments are merely intended to help understand the method and the core idea of this application. In addition, a person skilled in the art may make modifications to the specific implementations and application range according to the idea of this application. In conclusion, the content of this specification is not to be construed as a limitation to this application.

What is claimed is:

1. A method for generating a training sample of a semantic segmentation model, the method comprising:
    obtaining, by a device comprising a memory storing instructions and a processor in communication with the memory, an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps;
    determining, by the device, transformation models corresponding to the three-dimensional model, each of the transformation models corresponding to a different orientation angle;
    generating, by the device, a plurality of sample image groups corresponding to each transformation model according to the plurality of colorful skin maps and each transformation model, each sample image group comprising a plurality of sample images;
    generating, by the device, a labeled image of the each sample image group according to the object identifier, the plurality of solid-color skin maps, and each transformation model, the labeled image being used for labeling the sample images in the each sample image group; and
    generating, by the device, a training sample of the to-be-trained object according to the labeled image and the each sample image group, to train the semantic segmentation model by using the training sample of the to-be-trained object.

2. The method according to claim 1, wherein the generating the plurality of sample image groups corresponding to each transformation model according to the plurality of colorful skin maps and each transformation model comprises:
    rendering each transformation model according to each of the colorful skin maps, to obtain a plurality of first rendered models;
    projecting each of the first rendered models onto a game scene according to a plurality of preset projection directions, to obtain a plurality of first projection scenes, each of the projection directions being corresponding to one of the first projection scenes;
    generating an image of each of the first projection scenes, and using the generated image as a sample image; and
    classifying sample images corresponding to a same preset projection direction and a same transformation model as a group, to obtain the plurality of sample image groups.

3. The method according to claim 1, wherein:
the plurality of solid-color skin maps comprise a black skin map and a white skin map; and
the generating the labeled image of the each sample image group according to the object identifier, the plurality of solid-color skin maps, and each transformation model comprises:
    determining a plurality of first reference image groups according to the black skin map, a plurality of preset projection directions, and each transformation model,
    determining a plurality of second reference image groups according to the white skin map, the plurality of preset projection directions, and each transformation model, and
    generating the labeled image of the each sample image group according to the object identifier, the plurality of first reference image groups, and the plurality of second reference image groups.

4. The method according to claim 3, wherein the determining the plurality of first reference image groups according to the black skin map, the plurality of preset projection directions, and each transformation model comprises:
    rendering each transformation model according to the black skin map, to obtain a plurality of second rendered models;
    projecting each of the second rendered models onto a game scene according to the plurality of preset projection directions, to obtain a plurality of second projection scenes, each of the projection directions being corresponding to one of the second projection scenes;
    generating an image of each of the second projection scenes, and using the generated image as a first reference image; and
    classifying first reference images corresponding to a same transformation model as a group, to obtain the plurality of first reference image groups.

5. The method according to claim 3, wherein the generating the labeled image of the each sample image group according to the object identifier, the plurality of first reference image groups, and the plurality of second reference image groups comprises:
    obtaining a first reference image and a second reference image that correspond to a same preset projection direction from a first reference image group and a second reference image group that correspond to a same transformation model;
    changing a color of a region in which black pixels are located in the first reference image into white, and changing a color of remaining region in the first reference image into black;
    changing a color of remaining region in the second reference image other than a region in which white pixels are located into black; and
    generating the labeled image of the each sample image group according to the object identifier, the changed first reference image, and the changed second reference image.

6. The method according to claim 1, wherein after the generating the training sample of the to-be-trained object according to the labeled image and the each sample image group, the method further comprises:

inputting the training sample into a preset semantic segmentation model for training, to obtain a trained model;

obtaining a segmentation instruction, the segmentation instruction carrying a target game image, the target game image comprising at least one to-be-segmented object; and inputting the target game image into the trained model according to the segmentation instruction, to obtain an object contour and an object identifier of the to-be-segmented object.

7. The method according to claim 1, wherein before the obtaining the object identifier of the to-be-trained object and the model file corresponding to the object identifier, the method further comprises:

determining an installation path of a game application;

determining a plurality of storage files with file suffixes of a preset character string according to the installation path;

grouping the plurality of storage files according to file names of the storage files, to obtain a plurality of storage file groups, file names of each of the storage file groups comprising a name of a same game object;

determining an object identifier of each game object; and extracting a model file from a storage file group corresponding to the each game object, and copying and saving the model file and the object identifier.

8. An apparatus for generating a training sample of a semantic segmentation model, the apparatus comprising:

a memory storing instructions; and a processor in communication with the memory, wherein, when the processor executes the instructions, the processor is configured to cause the apparatus to perform:

obtaining an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps, determining transformation models corresponding to the three-dimensional model, each of the transformation models corresponding to a different orientation angle, generating a plurality of sample image groups corresponding to each transformation model according to the plurality of colorful skin maps and each transformation model, each sample image group comprising a plurality of sample images, generating a labeled image of the each sample image group according to the object identifier, the plurality of solid-color skin maps, and each transformation model, the labeled image being used for labeling the sample images in the each sample image group, and generating a training sample of the to-be-trained object according to the labeled image and the each sample image group, to train the semantic segmentation model by using the training sample of the to-be-trained object.

9. The apparatus according to claim 8, wherein, when the processor is configured to cause the apparatus to perform generating the plurality of sample image groups corresponding to each transformation model according to the plurality of colorful skin maps and each transformation model, the processor is configured to cause the apparatus to perform:

rendering each transformation model according to each of the colorful skin maps, to obtain a plurality of first rendered models;

projecting each of the first rendered models onto a game scene according to a plurality of preset projection directions, to obtain a plurality of first projection scenes, each of the projection directions being corresponding to one of the first projection scenes;

generating an image of each of the first projection scenes, and using the generated image as a sample image; and classifying sample images corresponding to a same preset projection direction and a same transformation model as a group, to obtain the plurality of sample image groups.

10. The apparatus according to claim 8, wherein:

the plurality of solid-color skin maps comprise a black skin map and a white skin map; and when the processor is configured to cause the apparatus to perform generating the labeled image of the each sample image group according to the object identifier, the plurality of solid-color skin maps, and each transformation model, the processor is configured to cause the apparatus to perform:

determining a plurality of first reference image groups according to the black skin map, a plurality of preset projection directions, and each transformation model, determining a plurality of second reference image groups according to the white skin map, the plurality of preset projection directions, and each transformation model, and generating the labeled image of the each sample image group according to the object identifier, the plurality of first reference image groups, and the plurality of second reference image groups.

11. The apparatus according to claim 10, wherein, when the processor is configured to cause the apparatus to perform determining the plurality of first reference image groups according to the black skin map, the plurality of preset projection directions, and each transformation model, the processor is configured to cause the apparatus to perform:

rendering each transformation model according to the black skin map, to obtain a plurality of second rendered models;

projecting each of the second rendered models onto a game scene according to the plurality of preset projection directions, to obtain a plurality of second projection scenes, each of the projection directions being corresponding to one of the second projection scenes;

generating an image of each of the second projection scenes, and using the generated image as a first reference image; and classifying first reference images corresponding to a same transformation model as a group, to obtain the plurality of first reference image groups.

12. The apparatus according to claim 10, wherein, when the processor is configured to cause the apparatus to perform generating the labeled image of the each sample image group according to the object identifier, the plurality of first reference image groups, and the plurality of second reference image groups, the processor is configured to cause the apparatus to perform:

obtaining a first reference image and a second reference image that correspond to a same preset projection direction from a first reference image group and a second reference image group that correspond to a same transformation model;

changing a color of a region in which black pixels are located in the first reference image into white, and changing a color of remaining region in the first reference image into black;

changing a color of remaining region in the second reference image other than a region in which white pixels are located into black; and generating the labeled image of the each sample image group according to the object identifier, the changed first reference image, and the changed second reference image.

13. The apparatus according to claim 8, wherein, after the processor is configured to cause the apparatus to perform generating the training sample of the to-be-trained object according to the labeled image and the each sample image group, the processor is configured to further cause the apparatus to perform:

inputting the training sample into a preset semantic segmentation model for training, to obtain a trained model;

obtaining a segmentation instruction, the segmentation instruction carrying a target game image, the target game image comprising at least one to-be-segmented object; and inputting the target game image into the trained model according to the segmentation instruction, to obtain an object contour and an object identifier of the to-be-segmented object.

14. The apparatus according to claim 8, wherein, before the processor is configured to cause the apparatus to perform obtaining the object identifier of the to-be-trained object and the model file corresponding to the object identifier, the processor is configured to further cause the apparatus to perform:

determining an installation path of a game application;

determining a plurality of storage files with file suffixes of a preset character string according to the installation path;

grouping the plurality of storage files according to file names of the storage files, to obtain a plurality of storage file groups, file names of each of the storage file groups comprising a name of a same game object;

determining an object identifier of each game object; and extracting a model file from a storage file group corresponding to the each game object, and copying and saving the model file and the object identifier.

15. A non-transitory computer-readable storage medium, storing computer-readable instructions, wherein, the computer-readable instructions, when executed by a processor, are configured to cause the processor to perform:

obtaining an object identifier of a to-be-trained object and a model file corresponding to the object identifier, the model file comprising a three-dimensional model of the to-be-trained object and a skin map set, the skin map set comprising a plurality of solid-color skin maps and a plurality of colorful skin maps;

determining transformation models corresponding to the three-dimensional model, each of the transformation models corresponding to a different orientation angle;

generating a plurality of sample image groups corresponding to each transformation model according to the plurality of colorful skin maps and each transformation model, each sample image group comprising a plurality of sample images;

generating a labeled image of the each sample image group according to the object identifier, the plurality of solid-color skin maps, and each transformation model, the labeled image being used for labeling the sample images in the each sample image group; and generating a training sample of the to-be-trained object according to the labeled image and the each sample image group, to train a semantic segmentation model by using the training sample of the to-be-trained object.

16. The non-transitory computer-readable storage medium according to claim 15, wherein, when the computer-readable instructions are configured to cause the processor to perform generating the plurality of sample image groups corresponding to each transformation model according to the plurality of colorful skin maps and each transformation model, the computer-readable instructions are configured to cause the processor to perform:

rendering each transformation model according to each of the colorful skin maps, to obtain a plurality of first rendered models;

projecting each of the first rendered models onto a game scene according to a plurality of preset projection directions, to obtain a plurality of first projection scenes, each of the projection directions being corresponding to one of the first projection scenes;

generating an image of each of the first projection scenes, and using the generated image as a sample image; and classifying sample images corresponding to a same preset projection direction and a same transformation model as a group, to obtain the plurality of sample image groups.

17. The non-transitory computer-readable storage medium according to claim 15, wherein:

the plurality of solid-color skin maps comprise a black skin map and a white skin map; and when the computer-readable instructions are configured to cause the processor to perform generating the labeled image of the each sample image group according to the object identifier, the plurality of solid-color skin maps, and each transformation model, the computer-readable instructions are configured to cause the processor to perform:

determining a plurality of first reference image groups according to the black skin map, a plurality of preset projection directions, and each transformation model, determining a plurality of second reference image groups according to the white skin map, the plurality of preset projection directions, and each transformation model, and generating the labeled image of the each sample image group according to the object identifier, the plurality of first reference image groups, and the plurality of second reference image groups.

18. The non-transitory computer-readable storage medium according to claim 17, wherein, when the computer-readable instructions are configured to cause the processor to perform determining the plurality of first reference image groups according to the black skin map, the plurality of preset projection directions, and each transformation model, the computer-readable instructions are configured to cause the processor to perform:

rendering each transformation model according to the black skin map, to obtain a plurality of second rendered models;

projecting each of the second rendered models onto a game scene according to the plurality of preset projection directions, to obtain a plurality of second projection scenes, each of the projection directions being corresponding to one of the second projection scenes;

generating an image of each of the second projection scenes, and using the generated image as a first reference image; and classifying first reference images corresponding to a same transformation model as a group, to obtain the plurality of first reference image groups.

19. The non-transitory computer-readable storage medium according to claim 17, wherein, when the computer-readable instructions are configured to cause the processor to perform generating the labeled image of the each sample image group according to the object identifier, the plurality of first reference image groups, and the plurality of second reference image groups, the computer-readable instructions are configured to cause the processor to perform:

obtaining a first reference image and a second reference image that correspond to a same preset projection direction from a first reference image group and a second reference image group that correspond to a same transformation model;

changing a color of a region in which black pixels are located in the first reference image into white, and changing a color of remaining region in the first reference image into black;

changing a color of remaining region in the second reference image other than a region in which white pixels are located into black; and generating the labeled image of the each sample image group according to the object identifier, the changed first reference image, and the changed second reference image.

20. The non-transitory computer-readable storage medium according to claim 15, wherein, after the computer-readable instructions are configured to cause the processor to perform generating the training sample of the to-be-trained object according to the labeled image and the each sample image group, the computer-readable instructions are configured to further cause the processor to perform:

inputting the training sample into a preset semantic segmentation model for training, to obtain a trained model;

obtaining a segmentation instruction, the segmentation instruction carrying a target game image, the target game image comprising at least one to-be-segmented object; and inputting the target game image into the trained model according to the segmentation instruction, to obtain an object contour and an object identifier of the to-be-segmented object.

* * * * *